United States Patent

Beaumont

[11] Patent Number: 6,077,470
[45] Date of Patent: Jun. 20, 2000

[54] METHOD AND APPARATUS FOR BALANCING THE FILLING OF INJECTION MOLDS

[75] Inventor: John P. Beaumont, Harborcreek, Pa.

[73] Assignee: The Penn State Research Foundation, University Park, Pa.

[21] Appl. No.: 09/173,076

[22] Filed: Oct. 14, 1998

Related U.S. Application Data

[60] Provisional application No. 60/061,888, Oct. 14, 1997, provisional application No. 60/081,840, Apr. 15, 1998, and provisional application No. 60/100,516, Sep. 16, 1998.

[51] Int. Cl.[7] .................................................. B29C 45/30
[52] U.S. Cl. .................................... 264/297.2; 264/328.8; 264/328.12; 366/336; 425/572; 425/588
[58] Field of Search .......................... 264/297.2, 328.6, 264/328.8, 328.12; 366/336–340; 425/567, 572, 573, 588

[56] References Cited

U.S. PATENT DOCUMENTS

| | | |
|---|---|---|
| 3,632,090 | 1/1972 | White . |
| 3,664,638 | 5/1972 | Grout et al. . |
| 3,940,224 | 2/1976 | Armour . |
| 4,034,965 | 7/1977 | King . |
| 4,123,496 | 10/1978 | Gallizia et al. ........................ 264/328.8 |
| 4,299,553 | 11/1981 | Swaroop . |
| 4,451,224 | 5/1984 | Harding . |
| 4,541,982 | 9/1985 | Upmeier . |
| 4,620,958 | 11/1986 | Wiechard . |
| 4,752,199 | 6/1988 | Arai . |
| 4,848,920 | 7/1989 | Heathe et al. . |
| 4,905,901 | 3/1990 | Johnson . |
| 5,069,840 | 12/1991 | Arnott . |
| 5,262,119 | 11/1993 | Smith .................................. 264/328.8 |
| 5,683,731 | 11/1997 | Deardurff et al. . |

OTHER PUBLICATIONS

Article from *Journal of Injection Molding Technology*, dated Sep. 1997, vol. 1, No. 3 entitled "Mold Filling Imbalances in Geometrically Balanced Runner Systems" by John P. Beaumont and Jack H. Young (pp. 133–144).

Article from *Journal of Injection Molding Technology* dated Jun. 1998, vol. 2, No. entitled Solving Mold Filling Imbalances in Multi–Cavity Injection Molds by John P. Beaumont, Jack H. Young and Matthew J. Jaworski (pp. 47–58).

*Primary Examiner*—Jill L. Heitbrink
*Attorney, Agent, or Firm*—Thomas J. Monahan

[57] ABSTRACT

A method of balancing the flow of a molten polymer containing material in a multi-runner injection mold includes the step of providing a mold body having at least one mold cavity and at least two runners. The first runner includes first and second ends and is connected to a source of molten material. The first runner is connected to a second runner. The second runner is connected to the at least one mold cavity. A stream of a molten polymer containing material flows through the first and second runners. The stream is repositioned in a circumferential direction as it flows from the first runner through the second runner while maintaining continuity between laminates of the stream of the molten material in a radial direction. In this way, a balance is provided for the melt temperatures and material properties of the cross branching runners. An apparatus for producing molded products having balanced thermal, material and flow properties includes a device for repositioning a stream of the molten polymer containing material as it flows from a first runner into at least a second downstream runner. If desired, the stream of molten thermoplastic material can be repositioned by approximately 90 degrees.

77 Claims, 9 Drawing Sheets

METHOD AND APPARATUS FOR BALANCING THE FILLING OF INJECTION MOLDS

This application bases its priority on Provisional application Ser. No. 60/061,888 filed on Oct. 14, 1997, on Provisional application Ser. No. 60/081,840 filed on Apr. 15, 1998 and on Provisional application Ser. No. 60/100,516 filed on Sep. 16, 1998.

BACKGROUND OF INVENTION

This invention relates to a method and apparatus for flowing a stream of laminar flowing material into a mold having at least one runner branch, branching in at least two directions. More specifically, the present invention pertains to a method and apparatus for repositioning the non-symmetrical conditions of the flowing material to a desired position in a circumferential direction while maintaining continuity between laminates from the center through to the perimeter of the runner.

A conventional mold set for injection or transfer molding of laminar flowing polymer containing materials is constructed of high strength metals, usually tool steels having a very high compressive yield strength. A molded part is formed within a mold cavity. The mold cavity opens and closes during each molding cycle along a parting line in order to remove, or eject, the molded part. The material producing the molded part is fed from a material source to the cavity through a runner system. Often, several spaced mold cavities are defined in the mold. These cavities are each connected to a material source through a runner. Runners may include branches. A branch may occur at the end of a first runner section and would intersect at some angle relative to the first runner section. The angled branching second runner section may extend in one or more directions from its intersection with the first runner section. Non-symmetrical conditions are developed in a runner, flowing a stream of laminar flowing material, when a runner branch branches in at least two direction from the intersection with the first runner section. Branching may continue at the end of any number of progressively branching runner sections.

In multi-cavity molds, it is important that the material is delivered to each cavity of the mold at the same time and with the same pressure and temperature. Any variations in these conditions will result in variations in the parts which are produced within these cavities. Such variations can include the size, shape or weight of the product as well as the mechanical properties and cosmetic appearance of the product. To help assure balanced conditions, the length and diameter of the runner feeding each cavity in a multi-cavity mold is preferably kept the same. This usually results in the runners being laid out in either a radial pattern, a branching "H" pattern, or some combination of a radial and a branching "H" pattern. With the radial pattern, the melt travels radially outwardly from the material source directly feeding a single cavity. Variations of this may branch the end of each runner section and feed two or more cavities. With an "H" type pattern, the runner is continually split in two directions at the end of a given section. In some cases a radial pattern can be placed at the end of a branching "H" patterned runner.

When molding parts using multi-cavity molds, it is important that each cavity in the multi-cavity mold produce substantially identical parts. This results in consistent part quality and maximum productivity. In order to provide such a mold, the cavity dimensions must by nearly identical for each of the several cavities and the cooling and delivery of the flowing material to each cavity should be substantially the same. It is, therefore, standard practice in the design of multi-cavity molds to "naturally balance" the runner system in order to help provide the required mold filling consistency. In naturally balanced runners, the same cross sectional shape and length of runner feeds each cavity. The same concept of a natural, or geometrically, balanced runner system may also be applied to multiple runner branches which may be feeding a single part at multiple locations.

Most multi-cavity injection or transfer molds are designed with a naturally balanced or geometrically balanced runner system in order to minimize variations in the material flowing into the cavities during production.

Despite the geometrical balance, it has often been observed that the filling of molds utilizing these naturally balanced runner designs result in imbalances. In most case, such imbalances have not been recognized until there are more than four cavities in the mold. However, the imbalance is actually dependent on the number of branches in the runner and can even affect a part molded in a single multi-gated cavity, dependent on the layout of the runner system. It has been found that the parts formed in some of the cavities, usually those on the inside branches closest to the material source, are commonly larger and heavier than are the parts formed in the other cavities.

These flow imbalances have historically been attributed to variations in mold temperature and/or mold deflection. Applicant has identified that there is a flow-induced cavity filling imbalance which exists in many of the most commonly used and accepted "naturally balanced" runner designs such as geometrically balanced "H" and modified "H" patterned runners, especially those with eight or more cavities. The flow imbalance can be created by a non-symmetrical shear distribution within a laminar flowing material as it travels through the runner system. Flow imbalance can also be created in a runner channel when a laminar flow material has a non-symmetrical temperature distribution created either by localized shear or differences in temperature between the flowing material and the runner wall. Both of these non-symmetrical conditions can result in variations in the viscosity of the flowing material and, in some cases, in its structure. In most cases, during conventional molding of thermoplastic and thermosetting materials, the result is a high sheared hotter, lower viscosity material around the inner periphery of the runner channel surrounding a relatively low sheared cooler, higher viscosity material in the middle of the runner channel. As flow is laminar, when a branch in the runner occurs, the high sheared hotter material along the perimeter remains in its relative outer position while the inner material is split and is now positioned on the opposite side of the flow channel from the high sheared hotter material. This side to side variation will create a variation between upcoming side to side branching runners, or a mold cavity, where the high sheared hotter material will flow to one side and the low sheared cooler material will flow to the other side.

Attention in this regard is directed to the article by Beaumont and Young in the *Journal of Injection Molding Technology*, September 1997, Volume 1, No. 3 entitled "Mold Filling Imbalances in Geometrically Balanced Runner Systems" (pages 133–143). This article is incorporated herein by reference in its entirety.

The problem has become more evident in recent years as tolerances of molded plastic parts have become more demanding and attention to quality has increased. The trend toward the use of smaller diameter runners, which it was thought would improve the molding process, has compounded the problem. Attention is also directed to the article by Beaumont, Young and Jaworski entitled "Solving Mold Filling Imbalances in Multi-Cavity Injection Molds" found in the *Journal of Injection Molding Technology*, June 1998, Volume 2, No. 2, pages 47–58. This article is also incorporated herein by reference in its entirety.

The imbalance found in a multi-cavity mold can be significant, resulting in mass-volume, flow-rate variations between the cavities of as high as 19—1 in extreme cases. The magnitude of the imbalance is material-dependent as is the sensitivity of the imbalance to process. A variety of different types of thermoplastics, including amorphous and semi-crystalline engineering and commodity resins, have been shown to exhibit significant mold filling imbalances in branching runner molds.

While the majority of the description herein will refer to thermoplastic materials, it should be recognized that imbalanced conditions can occur in any mold with a branching runner, branching in at least two directions, in which a variety or types of fluid can flow. Such imbalances occur for any fluid exhibiting a) laminar flow and b) viscosity which is affected by shear rate (as with a non-Newtonian fluid) and/or by temperature c) characteristics where variations in shear or flow velocity across a flow channel will create variations in the materials characteristics. Both of these characteristics are typical of thermoplastics, thermosetting materials and many of today's powdered metal and powdered ceramic molding materials. A polymer carrier is often employed with powdered metals and powdered ceramics. It is the polymer which gives such powdered metal or powdered ceramic materials the same characteristics as plastic materials exhibit in regards to viscosity effects and laminar flow.

The traditional methods of balancing flow in multi-cavity molds by restricting high flow runner branches or gates, cannot be expected to provide both a pressure and a thermal balance in the flowing material. Even if a pressure balance can be achieved, a melt temperature variation between the several cavities remains. Additionally the balance achieved by this means is very sensitive to material and process changes.

The ability of this invention to control the position of the asymmetric material conditions not only can be used to balance flow in runner branches but can be used to control the asymmetric material conditions flowing into a part forming mold cavity. Many of the properties of the molded part can be influenced by conditions of the melt from which it is formed. Some of these include how the molded part will shrink, warp, its mechanical properties and its appearance. With an understanding that a part might warp as a result of temperature variations, the asymmetric temperature across the laminar flowing material entering the cavity, through a runner and gate, could be positioned to control this warpage. With thermoplastic materials which will commonly warp towards a hot side of a mold, the asymmetric laminar flowing material could be positioned such that the hotter melt entering the cavity be placed along the cooler mold half. This could potentially offset the mold temperature variations. A similar principle could be applied to address effects of part geometry on warpage or some other need to control distribution of other material properties which might be affected by the shear and temperature variations.

Flow diverters have been used to change the flow patterns in laminar flowing material. One known device of this type is illustrated in U.S. Pat. No. 5,683,731 of Deardurff et al. This device contains a central flow channel and a plurality of diverters. The device is positioned in a melt stream. Melt from some portion of the inner laminates of the melt stream is fed into a central flow channel and melt from some portion of the outer laminates of the melt stream is fed into a plurality of diverters which are adjacent to the central flow channel. The melts from the two flow paths are later recombined such that the material from each of these flow regions is distributed equally between the plurality of flow channels.

However, in Deardurff et al., the inner and outer laminates of the flow channel are separated and recombined. This results in a more complicated and expensive device than what is necessary. Moreover, Dearduff's device would not be practical in a runner system which solidifies and is ejected from the molding process during each cycle as the device would become molded into the runner and ejected from the mold. Therefore, Deardurff's devise is limited to hot runner, or non solidifying runner, applications where the plastic in the runner does not solidify and is not ejected from the mold.

In addition, Deardurff's device is relatively complex and requires consideration of the relative sizes and shapes of the central flow channel and the diverter. The sizes and shapes of these channels will dictate a) how much of the outer laminates will be repositioned relative to the central flow channel b) where they will be positioned and c) their distribution relative to each other. Also, any changes in material or process may alter the distribution of the melt between the central and diverter channels. Furthermore, Deardurff's device accomplishes its objective by selectively diverting some portion of the outer laminates and distributing them among a plurality of channels. The disadvantage of this design is that it can only selectively rearrange the melt across the flow channel in two distinct inner and outer regions. This limits the contribution of this devise as the variation across a melt channel is continuous and complicated by the fact that the change in the materials conditions across the flow channel are not normally linear. Achieving a continuous redistribution of melt is not possible with a device which selectively separates the laminates into two distinct regions, namely the inner and outer regions.

Other known diverters are equally disadvantageous. None of these devices is capable of repositioning the laminates in a melt in a circumferential direction while maintaining continuity between the laminates in a radial direction.

Additionally, the division of the flow channel into a multitude of flow channels, i.e. the central channel and the several diverter channels in the known devices creates a potentially significant pressure loss—as pressure drop is approximately a function of the radius of a round flow channel to its fourth power—due to the resultant smaller channels. The alternative is to significantly increase the cross section of all the flow channels in order to alleviate the high pressure loss resulting from the smaller flow channels which significantly complicates the construction of such a mold.

Accordingly, it has been considered desirable to develop a new and improved process and apparatus for controlling flow in runners which would overcome the foregoing shortcomings and others while providing better and more advantages overall results.

BRIEF SUMMARY OF THE INVENTION

In accordance with the present invention, a new method and a new mold structure are provided for controlling mold filling. Mold filling is controlled in a mold having at least one runner which branches in two directions by controlling the position of non-symmetrical conditions of concentric laminates which occur across the flow path of a stream of laminar flowing material.

More particularly, in accordance with the method and mold structure of this invention, a mold body is provided having at least one mold cavity and a runner having at least one branch which branches in two directions. The runner includes at least a first runner section which intersects a second runner section. In some applications of this invention another portion of the runner branches in two directions and the second runner section branches in one direction, while in other applications it is the second runner which branches in two directions.

During a molding cycle a stream of laminar flowing material is flowed in the runner. The laminar flowing material has non-symmetrical conditions which occur in a direction across its path downstream of a branch in the runner where the first runner section intersects the second runner section. In accordance with this invention, these non-symmetrical conditions are repositioned to a desired position in a circumferential direction around the center of the path of the runner, while continuity is maintained between the laminates from about the center through to the perimeter of the runner.

More particularly, in accordance with one aspect of this invention, the non-symmetrical conditions of the laminar flowing material are repositioned by a laminate repositioner which is located in at least a portion of the runner. The laminate repositioner has a structure which determines both the amount and the direction of circumferential repositioning of the non-symmetrical conditions which occur.

In accordance with another aspect of this invention, the first runner section intersects the second runner section at an angle, and the laminate repositioner includes the intersection between these runner sections. The second runner section may branch at this intersection in one direction or it may branch in two directions through extensions in a first direction and in a second direction from the intersection by the first runner section. The first runner section may intersect the second runner section at a 90 degree angle or at any other angle which causes the desired repositioning of the non-symmetrical conditions. When branching extensions of the second runner section are not in a straight line with one another, the first runner section intersects each of them at an angle other than 90 degrees. This angle is also chosen to affect the amount of repositioning of the non-symmetrical conditions of the laminar flowing material.

In many applications of this invention, the runner includes a third runner section which is intersected by an end of the second runner section located in the first direction. The runner also includes a fourth runner section which is intersected by an end of the second runner located in the second direction. The laminate repositioner repositions the non-symmetrical conditions of the laminar flowing material to a position, in a circumferential direction about the center of the path of the second runner, which is substantially symmetrical from side-to-side relative to the third runner section and the fourth runner section. As a result, the normal imbalance of flow through the third runner section and the fourth runner section is significantly improved.

In still other applications of this invention, the repositioning of the non-symmetrical conditions is to a position, in a circumferential direction around the center of the path of the second runner section, which causes the non-symmetrical conditions to be distributed in a desired manner within the mold cavity. For certain applications of this invention it is advantageous to reposition the non-symmetrical conditions of the laminate flowing material approximately 90 degrees. For other applications of this invention it is advantageous to reposition the non-symmetrical conditions at some other angle to obtain the desired fill of one or more mold cavities.

In one embodiment of this invention the laminate repositioner uses at least one length of runner having a spiraling circumference with a non-circular cross sectional shape, which is progressively repositioned along each length of runner, to reposition the non-symmetrical conditions of the laminar flowing material. In another embodiment of this invention the laminate repositioner includes, in the runner, a dividing member having a spiraling shape which divides the cross section of the runner substantially in half along a radial direction. In either embodiment the amount of repositioning of the non-symmetrical conditions is at an angle of less than 180 degrees.

This invention can be used with many types of molds. Certain embodiments of this invention are particularly useful with molds of a type in which the laminate flowing material solidifies in the runner of the mold during each molding cycle and thereafter is removed from the runner prior to the completion of the molding cycle. One such embodiment of this invention can be applied to a mold of this type which has a pair of mold plates and a parting line between these plates which opens and closes during a normal molding cycle. The laminate repositioner includes a first runner section of the runner and a second runner section of the runner which are located along the parting line, with the first runner section intersecting the second runner section at an angle. The intersection occurs at an area on the periphery of the second runner section at which the centerline of the second runner section and the centerline of the intersecting first runner section are at different elevations from one another. At the area of intersection the laminar flowing material flows in a direction between the different elevations of these centerlines which is not the same direction as the flow in either the first runner section or the second runner section.

In this embodiment of this invention, the amount of change in elevation between the first runner section and the second runner section can be selected to affect the amount of repositioning of the non-symmetrical conditions which occurs. Alternatively, the angle of the direction of flow of the laminar flowing material between the centerlines of the first and second runner sections can be selected to affect the amount of repositioning of the non-symmetrical conditions. Another alternative is to choose the angle of intersection of the first runner section with the second runner section to affect the amount of repositioning of the non-symmetrical conditions. The structure of this laminate repositioner can take many forms, some of which are shown and described below.

This invention does not reside in any one of the features of the method and mold structure disclosed above which are more fully discussed in the Description of the Preferred Embodiment and claimed below. Rather, this invention is distinguished from the period art by its combination of structural features which make up a unique method and mold structure. Important features of this invention are shown and described below to illustrate the best mode contemplated to date of carrying out this invention.

Those skilled in the art will realize that this invention is capable of embodiments which are different from those shown and that the details of the method and mold structure can be changed in various manners without departing from the scope of this invention. Accordingly, the drawings and description are to be regarded as illustrative in nature and are not to restrict the scope of the invention. Additionally, the claims are to be regarded as including such equivalent methods and mold structures as do not depart from the nature and scope of this invention.

BRIEF DESCRIPTION OF THE DRAWINGS

The invention may take physical form in certain parts and arrangement of parts, preferred embodiments of which will be described in detail in this specification and illustrated in the accompanying drawings which form a part hereof and wherein.

DETAILED DESCRIPTION OF THE PREFERRED EMBODIMENTS

While this invention is generally related to a means for improving the balance between runner branches in a multi-cavity mold by rearranging the non-symmetrical conditions of a laminar flowing material in the runner of a mold to provide symmetry to a downstream branch, the means for rearranging a melt can also be employed to control the non-symmetrical conditions entering a mold cavity through a branching runner and thereby control the molded parts final characteristics. The runners can either be hot runners or cold runners.

During molding, where cavities in a mold are fed by a conventionally geometrically balanced H-type, or modified H-type branching runner, a separation of the high shear and low shear laminar flowing material will occur. This has been described above. However, such variation can take place in runners which exhibit patterns other than the H pattern, such as, for example, a radial pattern or combinations of radial and H patterns.

Figure 1:
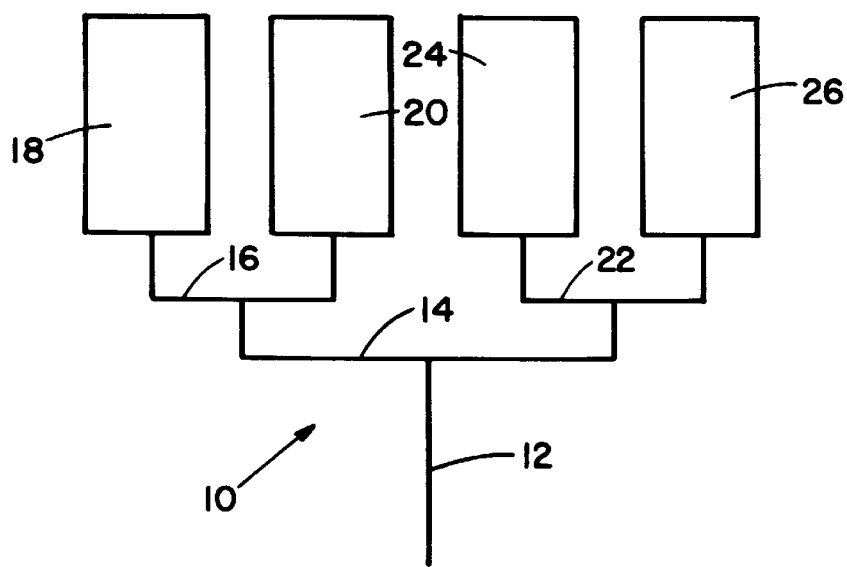
FIG. 1 is a schematic view of one type of multi-cavity injection mold layout which includes an "H" pattern of branching runners.

It is not always the case that the high sheared hotter material, which is normally near the outer laminates of the flow channel, ends up in cavities which are fed by the outer branching runners which are closest to the point of injection. The final point of destination relative to the point of injection is dependent on runner layout. FIG. 1 illustrates a-runner layout where the normally high sheared hotter laminar flowing material ends up in the outer cavities and the normally low sheared cooler material ends up in the inner cavities. More specifically, in FIG. 1, the laminar flowing material initially travels in a mold 10 along a first runner section 12. At the end of the first runner section, the material takes a 90 degree turn and splits in opposite directions as it flows into a second runner section 14. At the first end of the second runner section 14, the laminar flowing material flows into a first tertiary runner 16 which feeds a first mold cavity 18 and a second mold cavity 20. At the second end of the second runner section, the laminar flowing material flows into a second tertiary runner 22 which feeds a third cavity 24 and a fourth cavity 26. The layout illustrated in FIG. 1 is such that the high sheared hotter laminar flowing material is expected to end up in cavities 18 and 26 which are further from the point of injection than are cavities 20 and 24 as this is the path of the high shear material developed around the perimeter of the first runner section 12.

Figure 2:
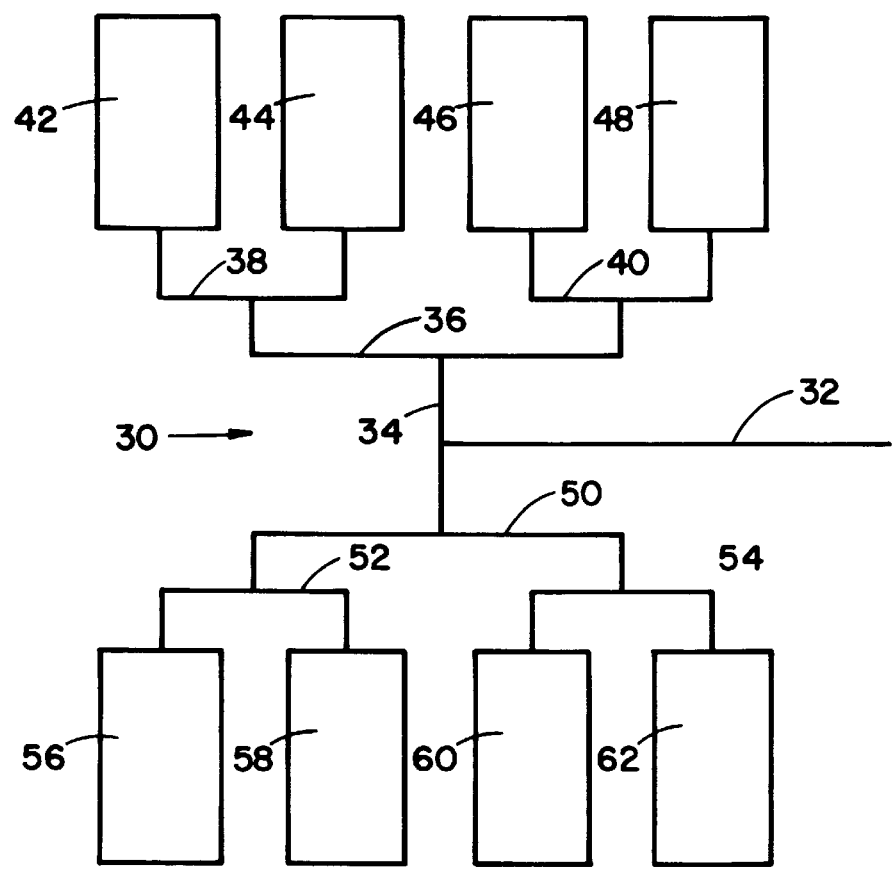
FIG. 2 is a schematic view of another type of a multi-cavity injection mold layout which includes an "H" pattern of branching runners.

Another type of conventional runner layout is illustrated in FIG. 2. This runner layout 30 includes a first runner section 32 which feeds a second runner section 34. One end of the second runner section feeds a first tertiary runner 36 which in turn feeds a pair of fourth order runners 38 and 40. The first fourth order runner 38 feeds first and second mold cavities 42 and 44. The second fourth order runner 40 feeds third and fourth mold cavities 46 and 48. At the other end of the second runner section 34, it feeds a second tertiary runner 50 which in turn feeds another pair of fourth order runners 52 and 54. A third fourth order runner 52 feeds fifth and sixth mold cavities 56 and 58. A fourth order runner 54 feeds seventh and eighth mold cavities 60 and 62.

In each of these cases, the designer is striving to keep the runner lengths and diameters feeding each cavity substantially the same. The diameters of the runners may change along their lengths but the change needs to be consistent in each of the branches feeding the cavities. This construction provides a geometrical balance to the runner system.

During laminar flow, the laminar flowing material flowing near the stationary runner walls experiences an increased shear versus that portion of the laminar flowing material which is traveling in the midstream of the runner channel. During the thermoplastic injection molding process, frictional heating occurs just inside of a thin frozen layer formed as the plastic touches the cold runner surfaces. In thermosetting material, not only does frictional heating occur but the mold is generally hotter than the material introduced into the mold. This tends to compound the thermal variation that is created within these outer high friction laminates and the innermost laminates or portions of the laminar flowing material.

The result of this frictional heating is a relatively high temperature layer which is created near the outermost perimeter of the runner channel. When the melt comes to the end of a runner branch, it is split in two directions. Due to the nature of the laminar flow, the high sheared hotter material traveling along the outer laminates will maintain its position to a significant extent along the outer region of the flow channel. This will result in the high sheared hotter material from a first runner section flowing along the inside edge of a second runner section which branches in two directions. With the branch of the second runner section that goes to the right, the high sheared hotter outer laminate on the right side of the first runner channel section will flow along the wall of the right side of the new branch. The cooler low sheared center laminate will go to the opposite left side of the new right turning runner branch. The opposite will happen in the left branch of this second runner section where the high sheared hotter outer laminate of the left side of the first runner section will flow along the wall on the left side of the new branch. The low sheared cooler center laminate will flow to the opposite right edge of the new left turning runner channel. The result will be that one half of the two branching second runner sections will be hotter than will the other half.

If at the end of this left and right branching runner section, the melt enters a cavity, the high sheared material will continue into the cavity and proceed along one side and the low sheared material will proceed into the cavity along the other side. This side to side variation in material conditions may result in undesirable characteristics in the molded part.

At the end of this second left and right branching runner section, if the runner is again split, i.e. as in FIG. 1 and 2, the high sheared hotter material follows the branch on its side and the low sheared cooler material follows the branch on its side. The result is that the material traveling down each of these further runner branches will be of a different temperature and shear history. This material may then enter directly into one or more cavities or may continue to be split as in FIG. 2. Each time the flow is split at a new runner branch, the high sheared hotter material follows the inside edge of the new runner branch. The result is that the laminar flowing material approaching and entering the center most cavities fed from the high sheared hotter outer laminates of the first runner section of a mold with this type of runner system has a hotter melt temperature than the temperature of the material entering the outermost mold cavities fed from the low sheared cooler inner laminates of the first runner system. With reference now to FIG. 2, mold cavities which would receive the relatively low sheared cooler temperature material would be mold cavities 42, 44, 46, 56, 58, and 60. The mold cavities which would receive the relatively high sheared hotter material would be mold cavities 48 and 62. These mold cavities are in the path of high shear melt developed in the first runner section 32. Such variations in temperature will result in variations in the final molded product which might include size, weight and mechanical properties. As the variation in material conditions can be nearly continuous across the runners path, it can be expected that each time a runner branches, the melt conditions feeding each of the branches will be different. Therefore it can be expected that there is also a variation between cavities 42,44 and 46 and between cavities 56, 58 and 60. The mold will have four different sets of molded parts. The four sets being molded with like material will be 48 and 62, 46 and 60, 44 and 58, 42 and 56.

In the conditions described above, it is assumed that frictional heating dominates over any cooling of the melt provided by the walls of the mold. With materials like most moldable plastic materials the resulting variation in temperature is compounded by the shear thinning which is occurring in these outer high friction regions due to the non-Newtonian characteristics of plastic materials. Such non-Newtonian characteristics will also affect viscosity of the melt across the channel. In some cases where frictional heating is not the dominating parameter, as might occur with large runner diameters and slow flow rates, the opposite condition could occur where the outer laminates are cooler than the inner laminates. In either case, there is a likelihood of a variation in melt temperatures, viscosity and/or the flow conditions across the runner channel. All of these variations will be carried on into a part forming mold cavity, or into downstream runner branches as described above which will eventually feed into a part forming mold cavity.

To provide a consistent melt to each of the cavities fed by branching runners such as is illustrated in FIGS. 1 and 2, the laminar flowing material may be repositioned in a circumferential direction, while maintaining continuity between the laminates in a radial direction. The rotation of all the laminates, without separation, provides the best assurance that continuous variations which exist through a runners cross section are all affected by the circumferential repositioning. The present invention provides for repositioning all of the fluid laminates in a runner in a circumferential direction which is perpendicular to the direction of flow. Such repositioning is relative to the approximate center through to the perimeter of the stream of laminar flowing material without requiring the physical separation or repositioning of the relative positions of the laminates—i.e., the laminates from the central region do not move to the outer region of the cross section of the flow channel and vice versa, nor do limited selected regions of outer or inner laminates require specific repositioning through specially balanced channels. Instead, the present invention strategically repositions the locations of all the laminates across the flow channel such that when they are split at a-downstream branch in the runner, the melt conditions between the two branches are more balanced. When so repositioned, the viscosity and thermal variation will not be from the left side to the right side of a runner channel, but rather will be from the top to the bottom of the runner channel. When the repositioned melt in a runner channel now feeds a further left and right branching runner each of the right and left branching runner sections will receive nearly equal top to bottom melt variations. The amount of repositioning can vary dependent on the required positioning of the flow laminates to achieve the objective of balancing the melt conditions in a branching runner system or to strategically place the melt laminates within a part forming mold cavity.

Several embodiments of a means for repositioning the flow of a laminar flowing material according to the present invention will be disclosed hereinafter.

Figure 3:
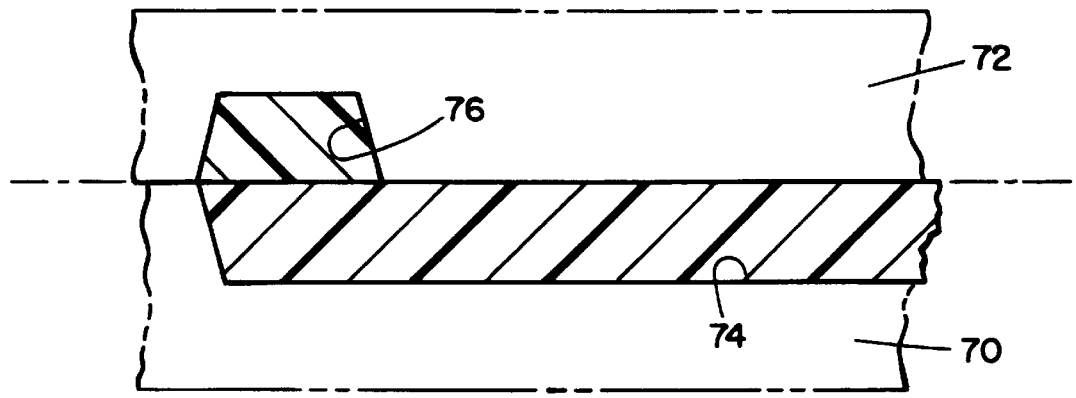
FIG. 3 is a side elevational view in cross section of adjacent portions of two runner sections which are at an angle to each other along a mold parting line showing a means for repositioning a flow of laminar flowing material according to a first preferred embodiment of the present invention.

When a laminar flowing material flowing through a runner channel changes direction, the material will remain substantially in its relative position across its flow path, i.e. circumferential positioning of melt laminates will remain substantially the same relative to a plane common to both runner sections. Changes in the relative circumferential position of flow laminates between a first and second runner section is accomplished through a number of embodiments of the present invention by causing the material to flow through compound directional changes combining three flow directions where no more than two of the three flow directions can be described on a common plane, i.e. the angle between a first and second flow direction will be on a different plane than the angle between the second and third flow direction. Thereby, though the circumferential positioning remains the same along a given directional change, the compound angles along different planes causes the flowing material entering the first directional change to become circumferential repositioned relative to the material exiting the second directional change. With reference now to FIG. 3, a mold used with a solidifying runner including a first mold half 70 and a second mold half 72 is there illustrated. Defined in the first mold half is a first runner section 74. Defined in a second mold half is a second runner section 76 which is intersected on it periphery by one end of a first runner section 74 which is at a different elevation and extends at an angle which is approximately perpendicular thereto. In this embodiment, the laminar flowing material travels along the first runner section 74. At the point at which the first runner section would normally branch, within the same mold half 70 into a second runner section, the first runner channel is terminated. At least a portion of the branching or second runner section is defined at a different elevation in the second mold half 72 at its intersection with the first runner section and can either entirely or partially overlap the end of the first runner. The melt is repositioned in the runner by diverting the flow of the melt in a direction approximately normal to the longitudinal axes of the primary and secondary runners.

At the end of the first runner section channel 74, the melt is diverted upwardly, in a direction approximately normal or perpendicular to the molds parting line. After traveling a short distance in this perpendicular direction, the melt enters the secondary runner 76. The second runner section 76 extends in a direction approximately perpendicular to the first runner section The flow geometry of FIG. 3 will result in the hotter outer laminate being located adjacent the bottom of the secondary runner 76 and the cooler inner laminate being located adjacent the top of the secondary runner.

Having the melt travel approximately normal or perpendicular to the plane of the mold parting line prior to entering the intersecting branching runner, effectively rolls the melt entering the secondary runner approximately 90 degrees relative to its previous position in the primary runner.

Another way of describing FIG. 3 is that as the end of the first runner section terminates at a different elevation from the intersecting portion of the second runner section, the laminar flowing material is forced to flow in a direction between the differences in elevation of the flow center lines of the first runner section 74 and second runner sections 76 at the intersection of the second runner section 76. The second runner section, which is at an angle to the first runner section, extends along the parting line of the mold and may extend in one or two directions from the intersection. The elevation differences of the two intersecting runner sections causes the laminar flowing material to flow along the direction of the elevation change between 74 and 76 which is a direction that is not common to either of the intersecting runner sections 74 or 76 and creates a third flow direction and a second directional change. The resultant compound directional changes combine three flow directions where no more than two of the three flow directions can be described on a common plane. As the material flowing in the direction of the elevation change between 74 and 76 changes angle at the beginning of the second runner section 76, the high shear material which would have been traveling along the sides of the runner section 74 will be positioned substantially along the bottom of the branching runner section 76 if it is proceeding in two directions, or on the top and bottom of the branching runner section 76 if it is proceeding in one direction. Material flowing along the top and bottom of runner section 74 will become positioned substantially along the sides of runner section 76 whether it is branching in one or two directions. The effect is that the material proceeding down runner section 76 from the intersection will be repositioned circumferentially relative to its original position in the first runner section 74.

Figure 4:
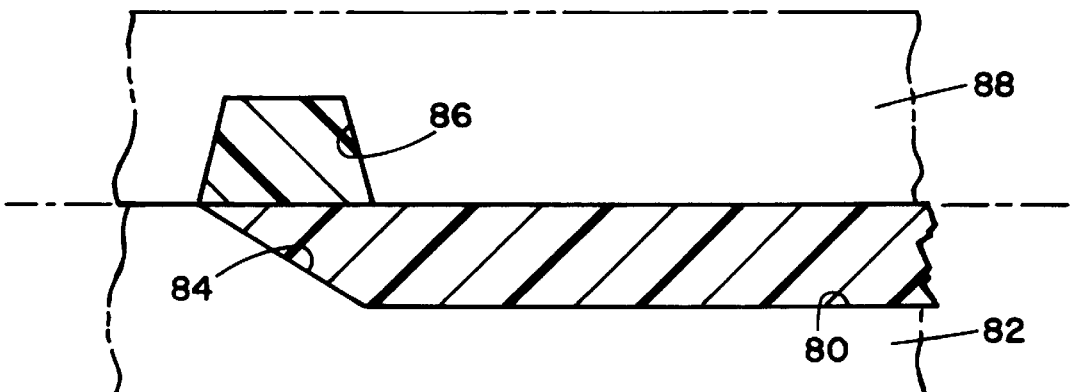
FIG. 4 is a side elevational view in cross section of adjacent portions of two runner sections which are at an angle to each other along a mold parting line according to a second preferred embodiment of the present invention.

A flow direction between the flow center lines of the runner sections 74 and 76 which causes the melt to travel approximately 90 degrees relative to the flow directions of both 74 and 76, which are also at 90 degrees to one another, will result in an approximate 90 degree repositioning in the circumferential direction of the laminar flowing material in the second runner section 76 relative to its previous position in the first runner section 74. However, in some cases, it may be desirable to reposition the melt in a circumferential direction by some other amount. This would include the cases where a mold's runner may include more than two branches or where a traditional sprue feeding a primary runner in a mold may be used. This could be accomplished in various ways. With reference now to FIG. 4, at the end of a first runner section 80 in a first mold half 82, the intersection of the channels could be constructed at some other angle than perpendicular to the plane of the mold's parting line causing the melt flowing through this junction to flow at some angle other than approximately 90 degrees to the flow directions of the first runner section. To this end, FIG. 4 shows an end wall 84 having an acute angle rather than a substantially perpendicular wall ending the channel. At least a portion of the second runner section 86 is positioned in a second mold half 88 where its flow center line is at a different elevation than, and where it is intersected on its periphery by, the first runner section 80 and at least a portion of end wall 84.

Figure 5:
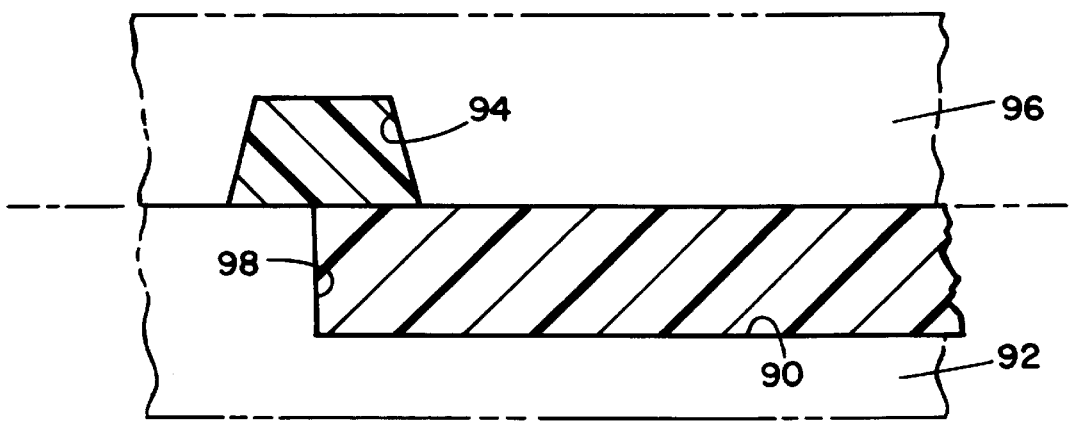
FIG. 5 is a side elevational view in cross section of adjacent portions of two runner sections which are at an angle to each other along a mold parting line according to a third preferred embodiment of the present invention.

Alternately, and with reference now to FIG. 5, a first runner section 90 is illustrated as being positioned in a first mold half 92 and at least a portion of a second runner section 94 is illustrated as being located in a second mold half 96 at a different elevation than, and is intersected on it periphery by, the first runner section. FIG. 5 shows an embodiment in which at least a portion of the second runner section partially overlaps the first runner section. This partial overlap will cause the flowing material to flow in a direction other than 90 degrees when it flows between the different elevations of the first and second runner sections.

Figure 6:
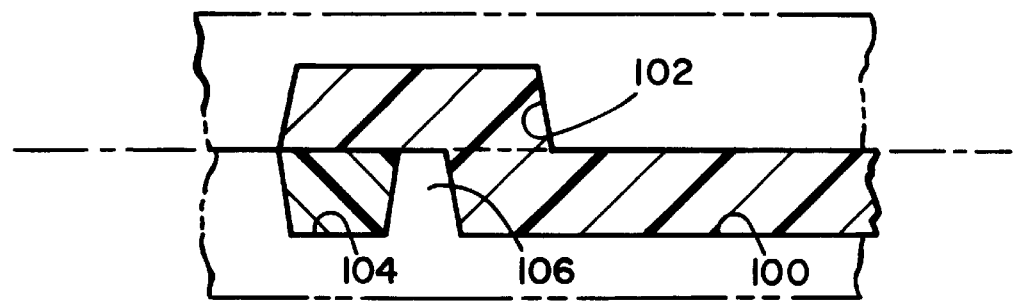
FIG. 6 is a side elevational view in cross section of adjacent portions of two runner sections which are at an angle to each other along a mold parting line according to a fourth preferred embodiment of the present invention.

With reference now to FIG. 6, a first runner section 100 is illustrated to be in the same mold half as at least a portion of the second runner section 104. In order to create the required additional flow direction at the angled intersection between the first and second runner sections a flow diverter 106, in conjunction with a first runner section extension 102 of runner section 100, causes the flowing material in runner section 100 to be positioned at a different elevation prior to where it intersects the second runner section 104 at its periphery. By this means the creation of the same additional flow direction described for FIG. 3 is provided at the intersection of first and second runner sections which are an angle to one another.

It is apparent from FIG. 6 that like FIG. 3 an approximately 90 degree repositioning in the circumferential direction of the of the laminar flowing material is accomplished because the flow diverter 106 causes the melt to be positioned in the first runner section extension 102, which is fully above the height, or cross section, of the second runner section 104. The melt thereby will travel approximately 90 degrees relative to the flow direction of both the first runner section extension 102 and second runner sections 104 while the two resultant directional changes can not be described on a same plane. The result is that the laminar flowing material in the second runner section will become repositioned in a circumferential direction by approximately 90 degree relative to its original position in the first runner section extension. As long as the first runner section extension and the first runner section are defined along the same parting line and are flowing in the same axial direction, the laminate positions in the circumferential direction for both will remain the same as they change elevation.

The sole purpose of the first runner section extension is to raise the centerline of the first runner section to a different elevation as the intersecting second runner section. Therefore it is considered a portion of the first runner section.

Figure 7:
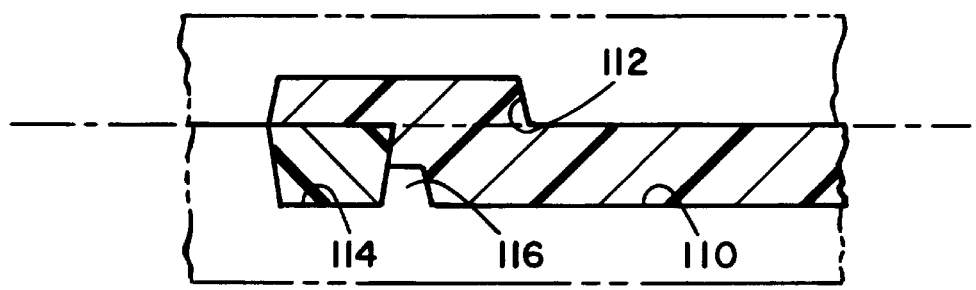
FIG. 7 is a side elevational view in cross section of adjacent portions of two runner sections which are at an angle to each other along a mold parting line according to a fifth preferred embodiment of the present invention.

With reference now to FIG. 7, an embodiment is disclosed in which there is less than a 90 degree repositioning of the melt in a circumferential direction. In this embodiment, a first runner section 110 communicates with a first runner section extension 112 which in turn communicates with a second runner section 114 which is at a different elevation than the first runner extension 112. However, in this embodiment, a diverter 116 which is defined in the material of the mold half between the first runner section 110 and the second runner section 114 does not cause the material in the first runner extension 112 to be elevated to a position which is fully above the height, or cross section, of the second runner section 114. This construction results in the laminar flowing material flowing at some angle less than 90 degrees as it flows from the first runner section extension 112 into the second runner section. This will result in the laminar flowing material being circumferentially repositioned in the second runner section by some angle less than 90 degrees relative to its original position in the first runner section extension channel. Thereby the height of the diverter controls the angle of the direction of flow of material between the two elevations.

Figure 8:
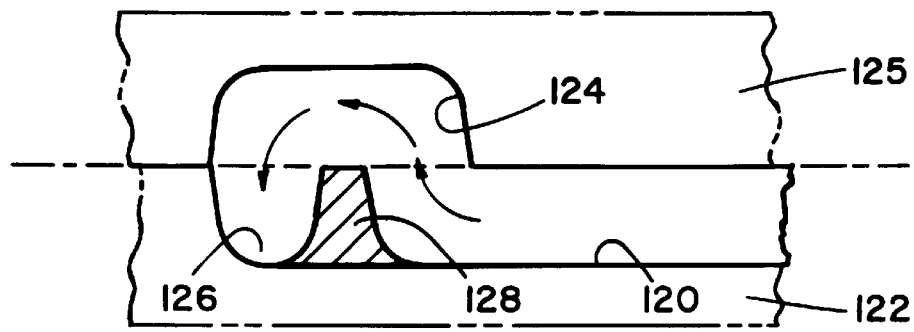
FIG. 8 is a side elevational view in cross section of two runner sections which are at an angle to each other along a mold parting line according to a sixth preferred embodiment of the present invention.

With reference now to FIG. 8, an embodiment of the invention is shown in which a first runner section 120 is defined in a bottom half 122 of the mold and a first runner section extension 124 is defined in a top half 125 of the mold. At least a portion of the second runner section 126 is defined in the bottom half mold 122 where it is intersected on its periphery by the first runner section extension and at a different elevation to the first runner extension. FIG. 6 and FIG. 8 are very similar except for the cross sectional shape of the runner in FIG. 6 is trapezoidal with non radiused corners whereas in FIG. 8 the bottom of the runner is radiused. This has little effect on the performance of the invention. The diverter 128, as illustrated, will cause the laminar flowing material to be positioned in the first runner section extension 124 at a height which is fully above the cross sectional height of the second runner section 126. The material flowing from 124 to 126 will therefore travel approximately 90 degrees relative to flow direction of both the first runner section extension and the second runner section resulting in a circumferential repositioning in the second runner section of the stream of laminar flowing material of approximately 90 degrees relative to its previous position in the first runner section extension. By reducing the height of the diverter 128, the angle of the direction of flow of material between the two elevations of the intersecting runners is reduced which reduces the relative circumferential position of the flowing material in the second runner section relative to its original position in the first runner section.

Figure 9:
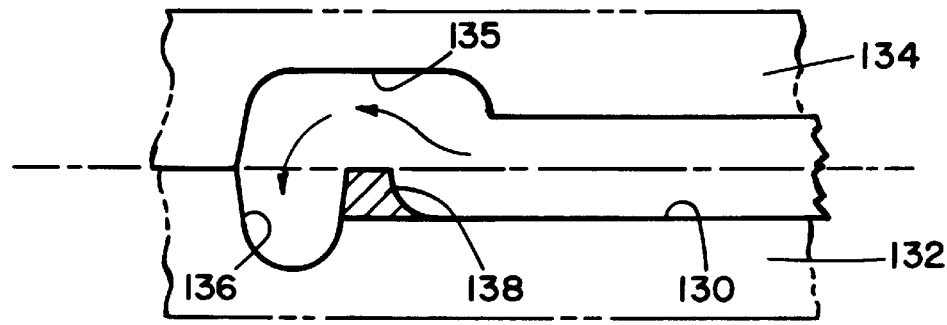
FIG. 9 is a side elevational view in cross section of adjacent portions of two runner sections which are at an angle to each other along a mold parting line according to a seventh preferred embodiment of the present invention.

With reference now to FIG. 9, another embodiment of the present invention is there illustrated. In this embodiment, a first runner section 130 is defined partially in a bottom mold half 132 and partially in a top mold half 134. A first runner section extension 135 is defined only in the top mold half 134. At least a portion of a second runner section 136 is defined only in the bottom mold half 132 at where it is intersected on its periphery by the first runner section extension and at a different elevation to the first runner section extension. A diverter 138 is positioned to cause the laminar flowing material to be positioned in the first runner section extension 135. As a portion of the first runner section 130 is already in the top mold half, the diverter 138 in FIG. 9 does not need to be as tall as diverter 128 in FIG. 8 in order to position the laminar flowing material at an elevation which is above the full height of the cross section of the second runner section. Despite the reduced height of the diverter in FIG. 9, an approximate 90 degree rotation is still achieved as the flow direction from the first runner section extension 135 to the angled second runner section 136 is approximately 90 degrees relative to the flow direction of both first runner section extension 124 and the second runner section 136.

By progressively reducing the height of the diverters in FIG. 6–9, the angle of the direction of flow of material between the two elevations of the intersecting runners is decreased. This reduced angle will reduce the relative circumferential repositioning of the laminar flowing material in the second runner section relative to it previous position in the first runner section. The same principle can be applied to the designs in FIG. 3–5 where reducing the elevation difference between the intersecting runners, changes the direction of flow of material between the two elevations, which will control the relative rotation of the flowing material. Additionally, by reversing the position of the overlapping runner sections along the parting line at their intersection, the direction of the of the circumferential repositioning of the laminar flowing material in all of the embodiments of the present invention as described in FIGS. 3–9.

Though the descriptions for FIGS. 3 through 9 above have been specific as to the location of the runners being along the parting line of a mold, these same methods could be used in a mold with non solidifying runners where the runners would not be on a mold parting line.

Figure 10:
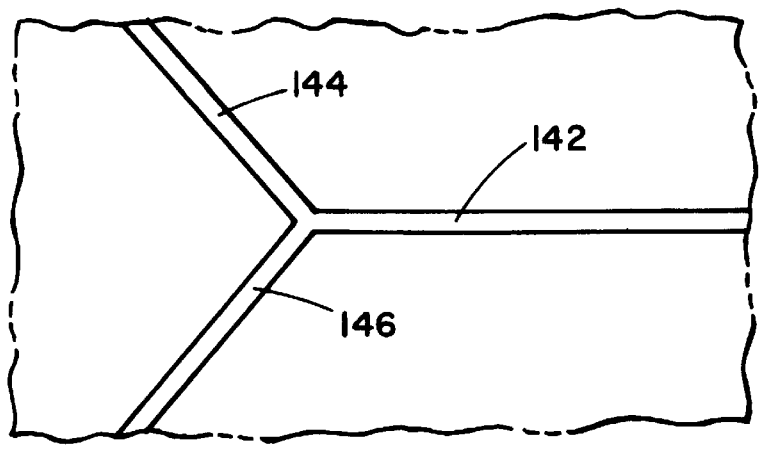
FIG. 10 is a top plan view of a branching runner system employing an angle other than 90 degrees between a first runner section and a left and right branching second runner section.

While in the previous embodiments, the second runner sections are all shown as being disposed approximately perpendicular to the first runner section, this need not always be the case. FIG. 10 illustrates a mold in which a first runner section 142 communicates with a pair of branching runners 144 and 146 that are disposed at an angle other than a 90 degree angle to the first runner section 142. When the elevation difference between the first and second runner sections, of the construction shown in FIG. 3–9, is included at the intersection of the angled branching runners, a rotation in the laminar flowing material will occur. However, by changing the angle between the intersecting first and second runner sections from 90 degrees at the point of their intersection and elevation change, the repositioning of the laminar flowing material in a circumferential direction into the branching runner sections can be controlled.

Figure 11:
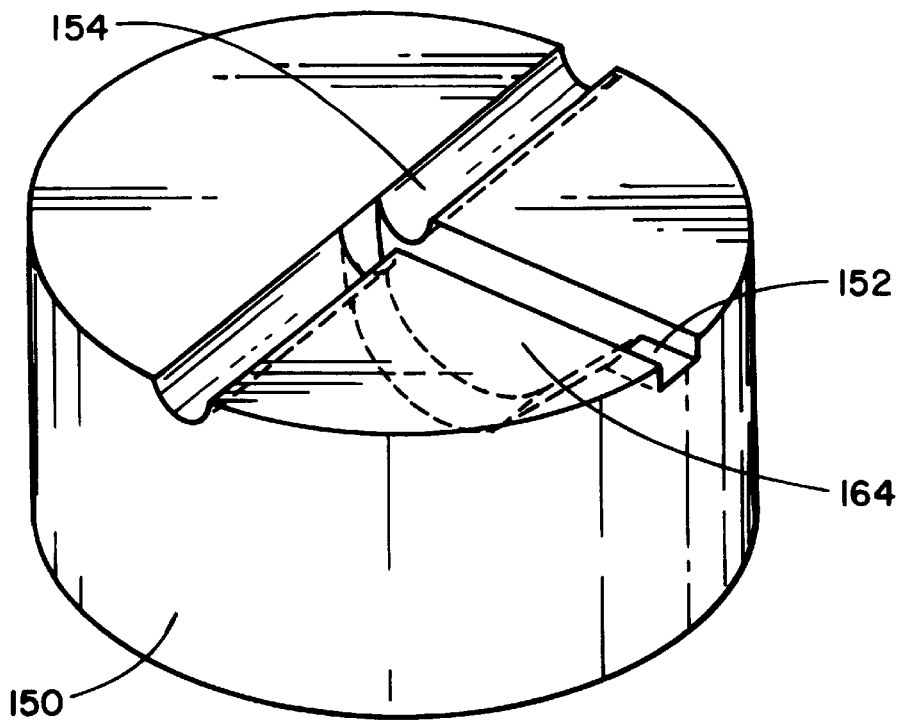
FIG. 11 is a perspective view of a cavity half intersecting runner insert of an mold according to another preferred embodiment of the present invention.

With reference now to FIG. 11, a cavity half 150 according to a preferred embodiment of the present invention is there illustrated. Partially defined in this cavity half is a first runner section 152. The first runner section communicates with a second runner section 154 that is also partially defined in the cavity half 150.

Figure 12:
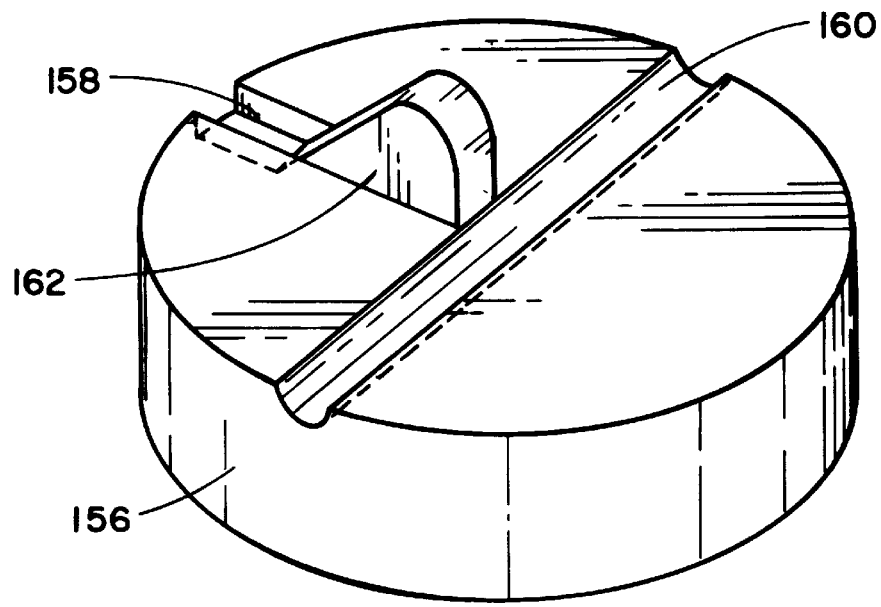
FIG. 12 is a perspective view of a core half intersecting runner insert of a mold which cooperates with the cavity half shown in FIG. 11.

FIG. 12 illustrates a core half 156 which is adapted to be mounted on the cavity half. Defined in the core half is another portion 158 of the first runner section and another portion 160 of the second runner section. Also defined in the core half is a protrusion 162 which fits into an indented section 164 of the first runner section 152 defined in the cavity half 150. In this way, a somewhat arching first runner section channel is defined by the core half and the cavity half. The flow of laminar flowing material will be such that the laminar flowing material will flow in an arc along the first runner section and approach the second runner section from below and in a direction approximately normal to both the longitudinal axis of the second runner section and to the longitudinal axis of the beginning of the first runner section. This construction provides a more distinct control of the direction of flow of material from the first runner section into the second runner section while still providing for the compound directional changes between a first runner section and a second runner section required to achieve the relative repositioning of the laminar flowing material a circumferential direction.

Figure 13:
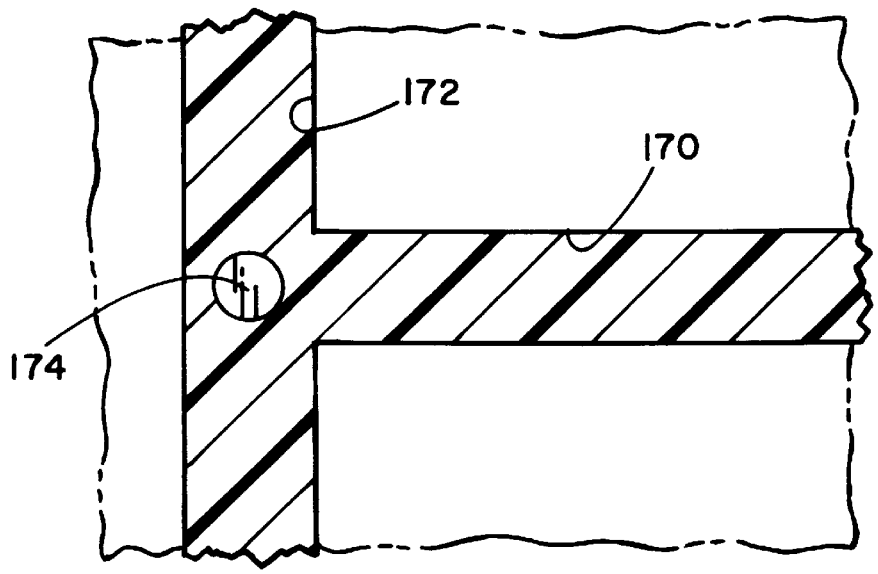
FIG. 13 is a top plan view of a pair of adjacent runners and a body positioned at the angle change of intersecting runners according to another preferred embodiment of the present invention.
Figure 14:
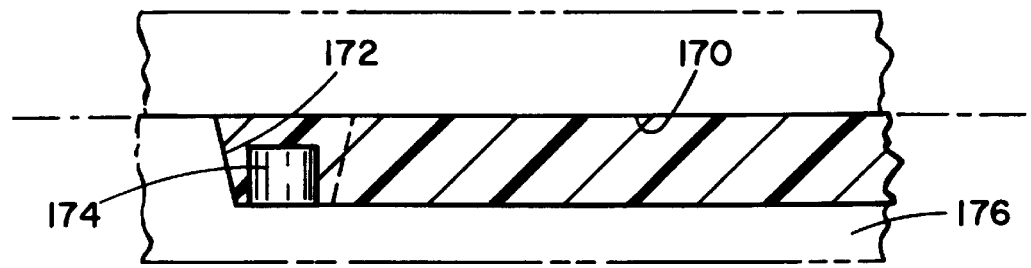
FIG. 14 is a side elevational view in cross section of the embodiment of FIG. 13.

With reference now to FIG. 13, another preferred embodiment of the present invention is there illustrated. In this embodiment, a first runner section 170 is shown as communicating with the second runner section 172. The longitudinal axis of the second runner section is oriented approximately normal to the longitudinal axis of the first runner section. Located at the intersection of the runners is a flow diverter in the form of a pin 174. As is illustrated in FIG. 14, the pin does not extend the entire height of the second runner section. Moreover, the diameter of the pin is smaller than is the diameter of either the first runner section or the second runner section. The height of the pin and the diameter of the pin are suitably controlled to adjust the flow of the laminar flowing material around the pin in such a way as to create an elevation change in a portion of the laminar flowing material at the junction of the runner sections and thereby creating the compound directional changes of the melt stream flowing from a first to second runner section creating the relative circumferential repositioning of the laminar flowing material. While a pin 174 is illustrated as the flow diverter, it should be appreciated that flow diverters having other shapes than a pin could also be employed. For example, flow diverters having the shape of an arrowhead or a hexagon could also be employed. Also, flow diverters with varying cross sections can be employed.

In other words, a means is provided for diverting the flow of the laminar flowing material through the use of an insert or pin which can be placed at the intersection of a pair of runners where it is desirable to reposition the melt. This allows an additional means for a repositioning to occur in a typical runner configuration in which the runners are all located in the same plane. As is evident from FIG. 14, one mold half 176 of the mold body contains both the first runner section 170 and the second runner section 172. The pin 174 can be detachably mounted to the mold half 176 at the intersection of the first and second runners sections. In this way, when a different type of thermoplastic is flowing through the runners, a pin with a different height, a different diameter or a different cross section may be used.

The present invention is advantageous even in a situation where there are four cavities using the runner layout as illustrated in FIG. 1, or even less. In each instance, the melt delivered to each cavity will still be balanced even though there may be thermal variations within the melt entering each cavity. What is important to recognize is that the thermal variations in the melt will exist within each cavity and not between the several cavities. If it is desirable that the material entering a cavity be the same from side to side, the melt could be repositioned as it is split in the runner immediately prior to approaching a particular cavity.

The embodiments of the present invention provided in the descriptions of FIGS. 3 through 14 describe the runner to be along a parting line. These methods provide for a runner which solidifies during normal molding cycles. By defining the runners along a molds parting line, the runner can be removed through conventional means between parting lines during every molding cycle by opening the parting line.

The impact of the imbalance of the flow is most dramatic when producing high precision products. As a result, many companies requiring high precision plastic products must limit the number of cavities in a mold in order to produce product in each of the cavities with the required high tolerances. However, with the balanced system provided by the invention herein, a mold with a larger number of cavities may be used and higher yields can thus be obtained. Therefore, the present invention can significantly reduces product costs in the molding process.

Figure 15:
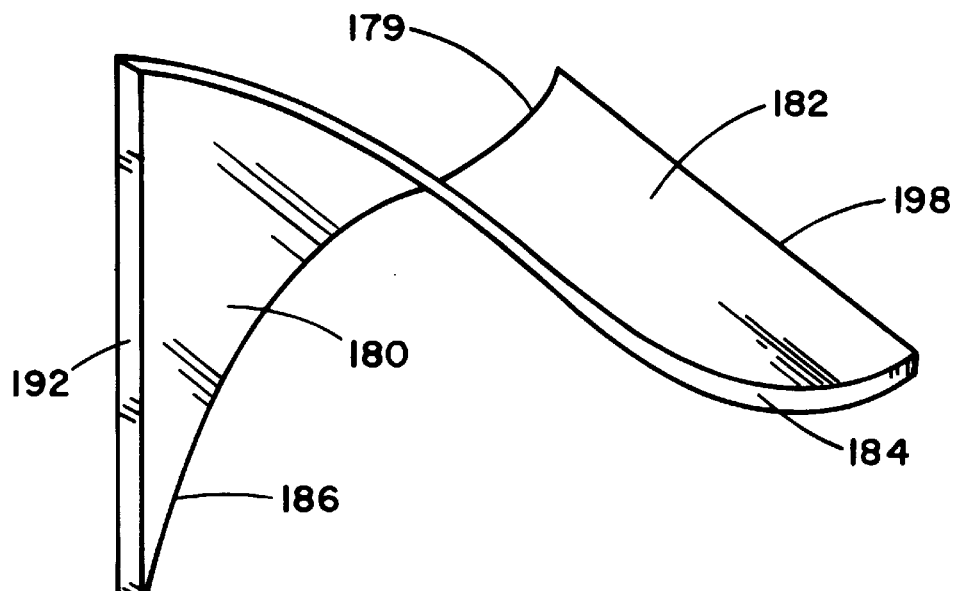
FIG. 15 is a perspective view of a spiraling runner dividing member according to another preferred embodiment of the present invention.
Figure 16:
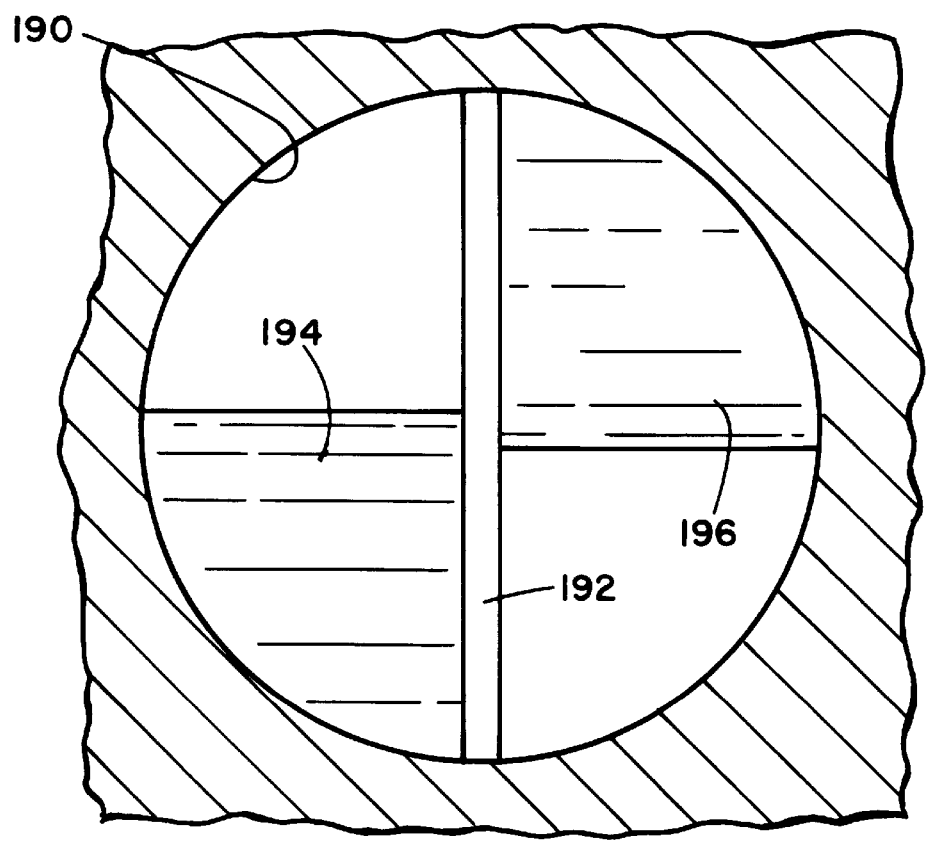
FIG. 16 is a front elevational view of the spiraling runner dividing member of FIG. 15 placed in a non solidifying runner channel.

With reference now to FIG. 15, another form of a laminar flow rotation devise 179 is there illustrated. This construction includes a runner dividing member having a spiraling shape and includes a first side 180, a second side 182, a first side edge 184 and a second side edge 186. The runner dividing member is positioned in a runner 190 as illustrated in FIG. 16. The runner dividing member has a leading edge 192 and forms a pair of spiraling surfaces 194 and 196 over which the laminar flowing material flows. The runner dividing member also has a trailing edge 198. The runner dividing member of FIG. 15, spirals 90 degrees between the leading edge 192 and the trailing edge 198. This will result in a rotation in the circumferential direction of the laminar flowing material flowing along it. The runner dividing member of FIGS. 15 and 16 is particularly useful in a non solidifying runner type system in which the laminar flowing material in the runner does not solidify between cycles and is not ejected between molding cycles. The runner dividing member 179 would normally be positioned in a runner after non-symmetrical conditions in the laminar flowing material has been developed and prior to where the repositioning in a circumferential direction is desired.

The runner dividing member 179 is positioned in the melt flow channel such that it divides the flow into two halves. The trailing edge 198, or exit end of the runner dividing member is twisted in a spiral by some angle in relation to the leading edge. The melt approaching the runner dividing member will be split into two "D" shaped flow paths. The spiraling runner dividing member will cause the melt to be moved in a circumferential direction. The divided "D" shaped flows are recombined at the trailing edge 198 of the runner dividing member. The relative positions of the laminates to each other will remain the same. Only their position along the circumference of the flow channel will have been changed. In the disclosed embodiment, the two halves of the melt are repositioned by approximately 90 degrees. However, for the non solidifying runner system, the runner dividing member can reposition the laminar flowing material by less than 90 degrees, such as, e.g., 70 degrees or more than 90 degrees, such as, e.g., 110 degrees or even 150 degrees, if that is desired.

The runner dividing member 179 can be employed at an intersection between two runners. However, it would normally be positioned downstream from a branch where the non-desirable melt variations have been created.

Figure 17:
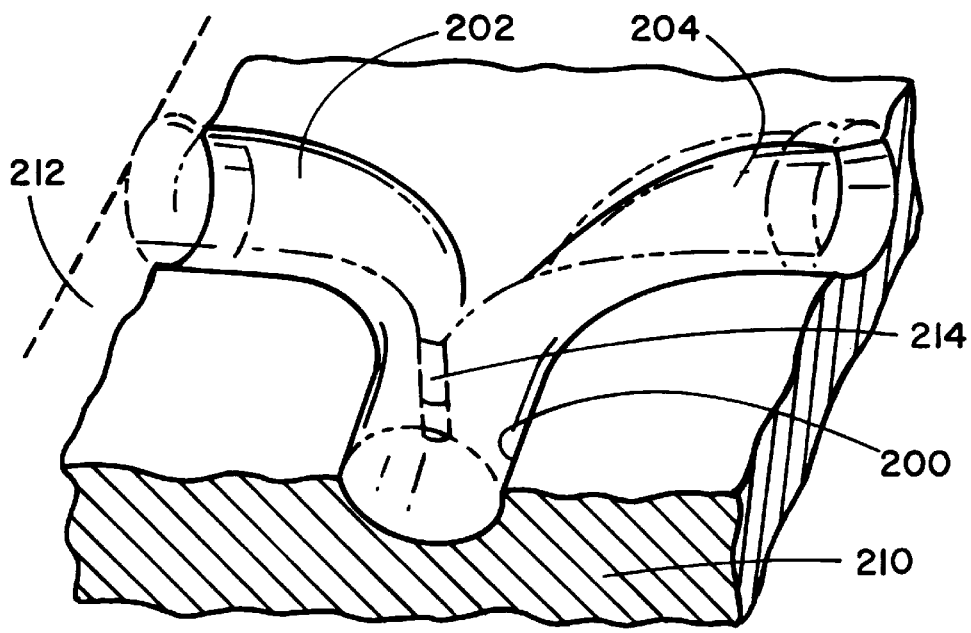
FIG. 17 is a perspective view of a portion of a spiraling circumference laminar flow rotation devise according to yet another embodiment of the present invention.
Figure 18:
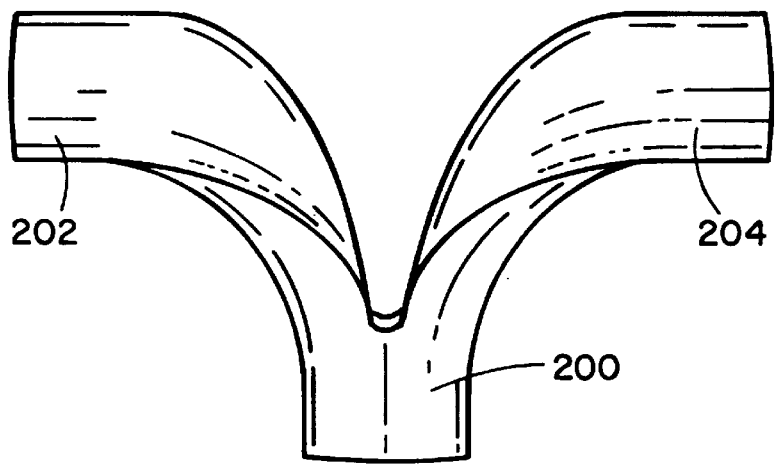
FIG. 18 is a top plan view of the runner section of FIG. 17 shown as a flow channel.
Figure 19:
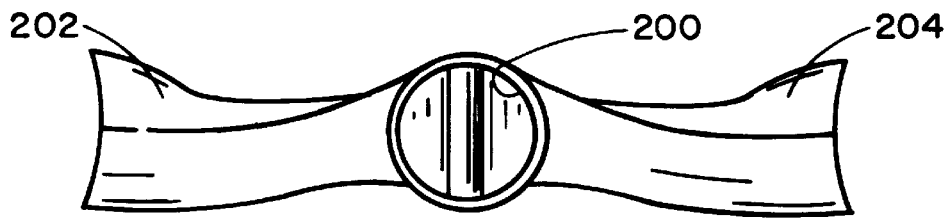
FIG. 19 is a front elevational view of the runner section of FIG. 17 shown as a flow channel.

With reference now to FIG. 17, a set of flow channels is there illustrated. In this embodiment, a first runner section 200 splits into first and second runner sections 202 and 204. The geometry of the flow path is such, however, that the substantially circular diameter of the first runner section leads to non-circular beginning portions of the second runner sections. The spiraling circumference of the noncircular flow paths at the outset of the second runner causes a repositioning in a circumferential direction of the laminar flowing material which flows from the first runner section to each of the second runner sections. The laminar flowing material is repositioned by about 90 degrees. It is apparent that in this embodiment, the runners 200, 202 and 204 are defined by mating channel halves in a pair of mold cavity halves 210 and 212. It is also apparent from FIG. 17 that a vertically extending wall 214 defines the end of the first runner section 200 and splits the flow of laminar flowing material into the pair of second runner sections 202 and 204. The non-circular shape of the beginning of the second runner sections 202 and 204 causes a repositioning of the laminar flowing material in a radial circumferential direction while maintaining continuity between the laminates of laminar flowing material in a radial direction. While the inlets to the second runner sections 202 and 204 are non-circular, once the repositioning has taken place, the second runner sections can assume a circular cross section which can then be maintained. With reference now to FIG. 18, a top elevational view is there illustrated of the design shown in FIG. 17. With reference now to FIG. 19, a view of the spiraling circumferential design of FIG. 17 is there shown as a flow channel. The inlet end of the first runner section 200 is shown feeding the two second runner sections 202 and 204.

It should be apparent that the spiraling circumference of the non-circular runner section causes the repositioning in a circumferential direction of the laminar flowing material and where space is available could be positioned downstream from the junction with the first runner section. It should also be understood that the non circular cross sectional shape could take any form where the spiraling shape will cause a spiraling effect on the melt flowing through it.

It should be apparent that the instant invention is useful not only in situations where there is a multi-cavity mold, but also in situations where there is a many branched runner system which feeds a single central mold cavity.

Figure 20:
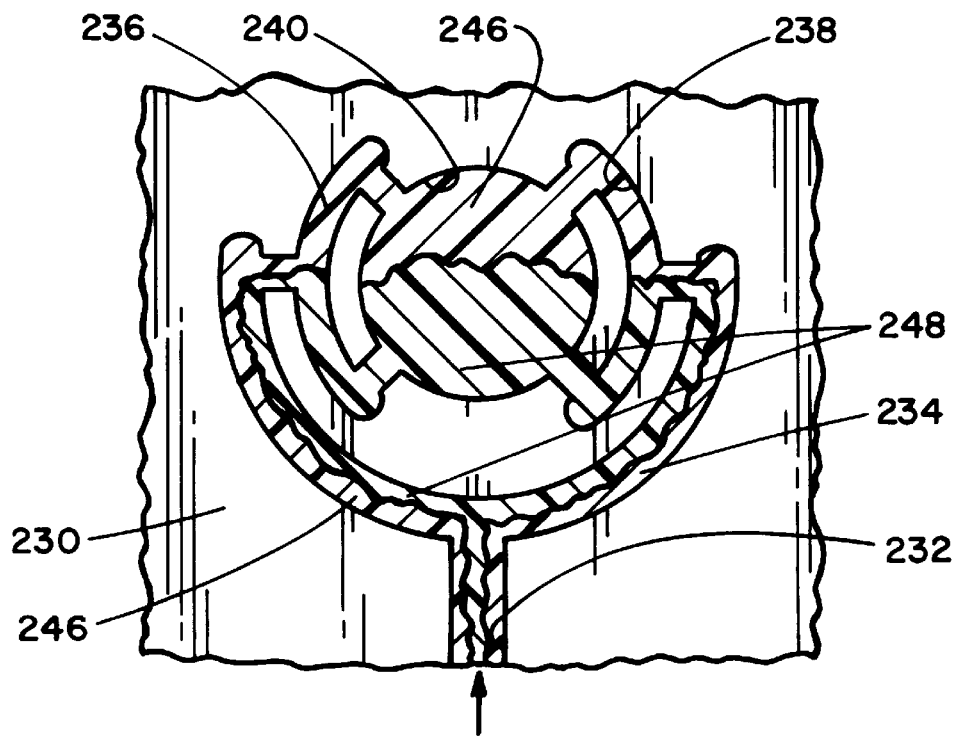
FIG. 20 is a schematic view of one type of single cavity multi-gated mold, illustrating expected variations in melt conditions when the present invention is not used, in which a means for repositioning the non-symmetrical laminar flowing material according to the present invention can be employed.

With reference now to FIG. 20, another type of conventional mold is there illustrated. This mold 230 is a single cavity multi-runner mold for manufacturing a circular object. The mold includes a first runner section 232, a second runner sections 234 and a pair of tertiary runners 236 and 238 which lead to several gates of a mold cavity 240. FIG. 20 also illustrates the path of a high shear laminar flowing material 246 and a low shear laminar flowing material 248 which flow into the mold cavity 240. Without the presence of a means for repositioning the laminar flowing material as it flows through the several runners—such as the means disclosed herein—the circular object being molded will have differing properties depending upon which half, roughly, of the product is examined.

The magnitude of the flow imbalance is dependent upon which type of thermoplastic material is being molded and the process. Engineering resins, such as PMMA, 33% glass filled PA6/6, PBT and ABS showed the greatest sensitivity to flow imbalance. Polyolefins proved to be the least susceptible to flow imbalances of the materials tested.

Figure 21:
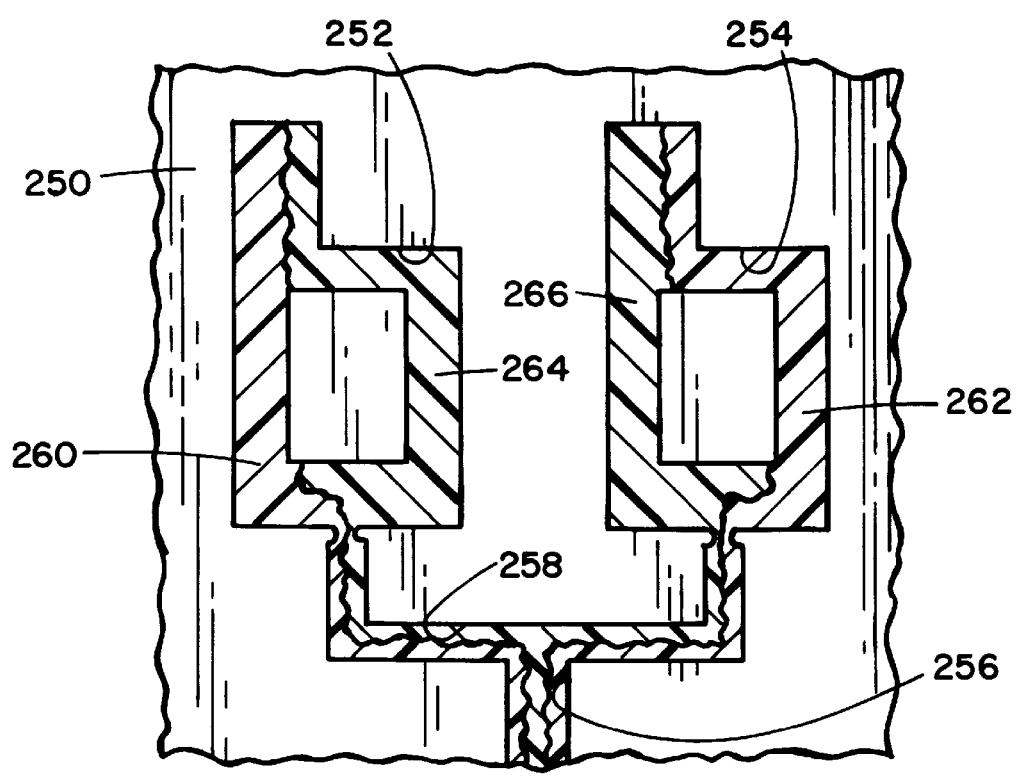
FIG. 21 is a schematic view of a two cavity, mold with non-symmetrical cavities, illustrating expected variations in melt conditions when the present invention is not used, in which a means for repositioning the non-symmetrical laminar flowing material according to the present invention can be employed; and, FIG. 22 is a schematic top plan view of a pair of spiraling dividing members of FIG. 15 positioned in a second runner section according to another embodiment of the present invention.

With reference now also to FIG. 21, a two cavity mold 250 is there illustrated with a simple runner system. In this embodiment, flow imbalances in the mold occurs because of the non-symmetrical parts which are being molded in the two mold cavities 252 and 254. As a result of the non-symmetrical mold cavities, laminar flowing material would be subject to differential filling of the two mold cavities 252 and 254 as it flows from a first runner section 256 into a second runner sections 258. Thus, in the absence of a means for repositioning the laminar flowing material, a first high shear layer of material 260 is outwardly oriented in the first mold cavity 252 and forms the left side of the molded part. A second high shear layer of material 262 is outwardly oriented in a second mold cavity 254, however forming the opposite right side of the like molded part. A first low shear material 264 is inwardly positioned in the first cavity 252 forming the right side of the molded part. A second low shear material 266 is inwardly positioned in the second mold cavity 254 however forming the opposite left side of the like molded part. The result is the two sides of the parts formed in the two cavities will be formed differently. This same condition could be developed in a four cavity mold where a second set of cavities and runners would be fed by the same first runner section.

Figure 22:
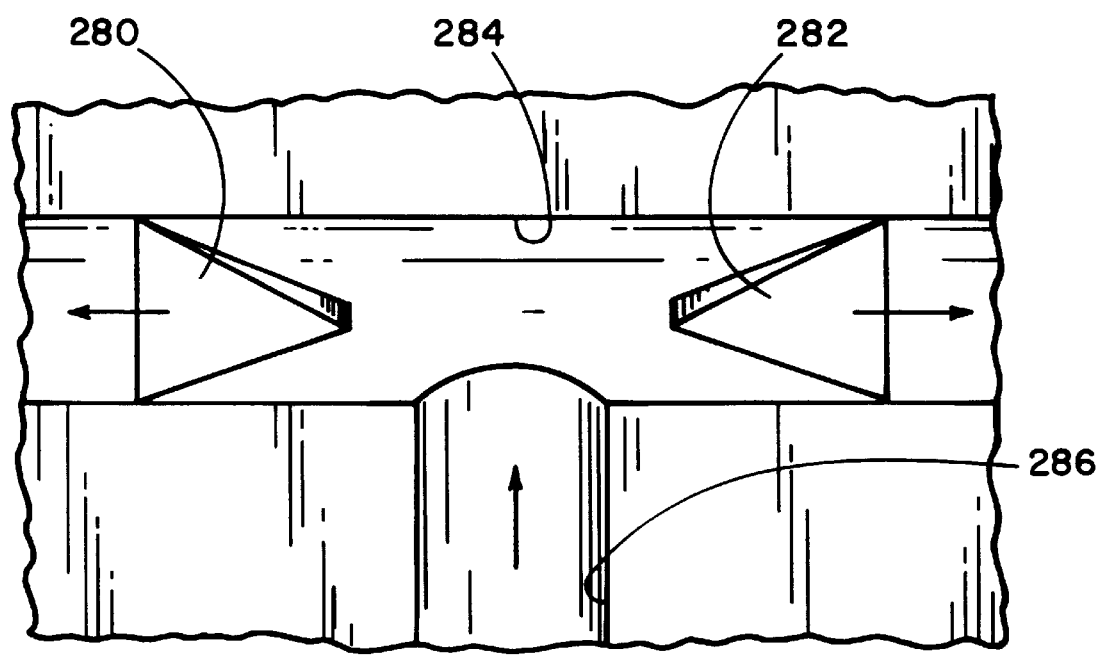

Finally, with reference now to FIG. 22, two spiraling flow runner dividing members 280 and 282, such as those illustrated, e.g. in FIGS. 15 and 16, can be positioned in a second runner section 284 in a non solidifying runner arrangement downstream from a first runner section 286 thereof. In this way, the laminar flowing material which flows in opposite directions in the second runner section 284 is rotated by the two spiraling diverters as it flows either directly into one or more mold cavities or into respective tertiary runners. One can employ more than the pair of spiraling diverters 280 and 282 illustrated in FIGS. 22.

The invention has been described with reference to several preferred embodiments. Obviously, modifications and alterations will occur to others upon the reading and understanding of the preceding specification. It is intended that the invention be construed as including all such alterations and modifications insofar as they come within the scope of the appended claims or the equivalents thereof.

What is claimed:

1. A method of controlling non-symmetrical conditions of concentric laminates which occur in a direction across the flow path of a stream of laminar flowing material in a mold having at least one branching runner, which branches in two directions, comprising:

providing a mold body having at least one mold cavity and a runner having at least one branch which branches in two directions;

flowing a stream of laminar flowing material in the runner to fill the at least one mold cavity, the material having non-symmetrical conditions in a direction across its path downstream of a branch in the runner; and repositioning the non-symmetrical conditions of the flowing material to a desired position in a circumferential direction around the center of the path of the runner while maintaining continuity between laminates from about the center through to the perimeter of the runner.

2. The method of claim 1 wherein the repositioning includes controlling both the amount and the direction of repositioning of the non-symmetrical conditions to the desired position.

3. The method of claim 1 wherein the amount of circumferential repositioning of the non-symmetrical conditions to the desired position is approximately 90 degrees.

4. A method according to claim 1 wherein the repositioning comprises including in the runner a length of runner having a spiraling circumference with a non-circular cross sectional shape which is progressively repositioned along the length of runner.

5. A method according to claim 1 wherein the repositioning comprises including in the runner a length of runner having a spiraling circumference with a non-circular cross sectional shape which is progressively repositioned along the length of runner, with the amount of spiraling causing the non-circular cross sectional shape to be repositioned at an angle of less than 180 degrees.

6. A method according to claim 1 wherein:

the repositioning occurs at the intersection of a first runner section of the runner and a second runner section of the runner, the second runner section extending in a first direction and in a second direction from the intersection; and the repositioning comprises including between the first runner section and the second runner section a first length of runner having a spiraling circumference with a non-circular cross sectional shape which is progressively repositioned along the first length of runner toward the first direction of the second runner section and a second length of runner having a spiraling circumference with a non-circular cross sectional shape which is progressively repositioned along the second length of runner toward the second direction of the second runner section.

7. A method according to claim 1 wherein:

the repositioning occurs at the intersection of a first runner section of the runner and a second runner section of the runner, the second runner section extending in a first direction and in a second direction from the intersection; and the repositioning comprises including between the first runner section and the second runner section a first length of runner having a spiraling circumference with a non-circular cross sectional shape which is progressively repositioned along the first length of runner toward the first direction of the second runner section and a second length of runner having a spiraling circumference with a non-circular cross sectional shape which is progressively repositioned along the second length of runner toward the second direction of the second runner section, with the amount of repositioning of the non-circular cross sectional shape of both the first length of runner and the second length of runner being an angle of less than 180 degrees.

8. A method of claim 1 wherein the repositioning includes providing in the runner a runner dividing member having a spiraling shape which divides the cross section of the runner substantially in half along a radial direction to circumferentially reposition the non-symmetrical conditions of the laminar flowing material.

9. A method of claim 1 wherein the repositioning includes providing in the runner a runner dividing member having a spiraling shape which divides the cross section of the runner substantially in half along a radial direction to circumferentially reposition the non-symmetrical conditions of the laminar flowing material to a position which is at an angle of less than 180 degrees from the original position of the non-symmetrical conditions.

10. A method according to claim 1 wherein the repositioning occurs at the intersection of a first runner section of the runner and a second runner section of the runner, the second runner section extending in a first direction and a second direction from the intersection, and the repositioning comprises including at the intersection of the first runner section and the second runner section a body having a cross section which is smaller than the cross section of either of the first runner section or the second runner section and is shorter in height than the height of either the first runner section or the second runner section.

11. A method according to claim 1 wherein the repositioning occurs at the intersection of a first runner section of the runner and a second runner section of the runner, the second runner section extending in a first direction and a second direction from the intersection, and the repositioning comprises including at the intersection of the first runner section and the second runner section a body having a cross section which is smaller than the cross section of either of the first runner section and the second runner section and is shorter in height than the height of either the first runner section or the second runner section, with the cross sectional size, the height and the position of the body selected to affect the amount of repositioning of the non-symmetrical conditions which occurs.

12. The method of claim 1 which includes providing a mold body in which the branching runner includes a first runner section; a second runner section which is intersected at an angle by the first runner section, with the second runner section extending in a first direction and a second direction from the intersection by the first runner section; a third runner section intersected by an end of the second runner section located in the first direction and a fourth runner section intersected by an end of the second runner section located in the second direction, with said third runner section and the fourth runner section each extending in two directions from their respective intersections with ends of the second runner; and the repositioning of the non-symmetrical conditions of the flowing material is to a position, in a circumferential direction around the center of the path of the second runner section, which is substantially symmetrical from side-to-side relative to the third runner section and the fourth runner section such that any imbalance of flow through the third runner section and the fourth runner section is significantly improved.

13. The method according to claim 1 which includes providing a mold body in which the branching runner includes a plurality of branches and the repositioning of the non-symmetrical conditions of laminar flowing material occurs at a plurality of sequential locations along the runner.

14. The method of claim 1 in which the repositioning of the non-symmetrical conditions of the laminar flowing material is to a position which causes the material to fill the at least one mold cavity in a selected manner.

15. The method of claim 1 which includes providing the branching runner with a first runner section and a second runner section, with the first runner section intersecting the second runner section at an angle, and repositioning the non-symmetrical conditions of the laminar flowing material substantially at the intersection of the second runner section by the first runner section.

16. The method of claim 1 which includes providing the branching runner with a first runner section and a second runner section, with the first runner section intersecting the second runner section at an angle of 90 degrees, and repositioning the non-symmetrical conditions of the laminar flowing material substantially at the intersection of the second runner section by the first runner section.

17. The method of claim 1 which includes providing the branching runner with a first runner section and a second runner section, with the first runner section intersecting the second runner section and the second runner section extending at a first angle in a first direction from the intersection by the first runner section and at a second angle in a second direction from the intersection by the first runner section which are other than 90 degrees, and repositioning the non-symmetrical conditions of the laminar flowing material substantially at the intersection of the second runner section by the first runner section.

18. The method of claim 1 in which the repositioning of the non-symmetrical conditions of the flowing material includes providing a first runner section and a second runner section of the runner, with the first runner section intersecting the second runner section at an angle and the intersection occurring at an area on the periphery of the second runner section at which the centerline of the second runner section and the centerline of the intersecting first runner section are at different elevations with respect to one another, at which area the laminar flowing material flows in a direction between the two elevations which is not the same direction as the flow in either the first runner section or the second runner section.

19. The method of claim 18 which includes selecting the amount of the difference in elevation which occurs between the centerline of the first runner section and centerline of the second runner section to affect the amount of repositioning of the non-symmetrical conditions which occurs.

20. The method of claim 18 which includes selecting the angle at the intersection of the first runner section and the second runner section to affect the amount of repositioning of the non-symmetrical conditions which occurs.

21. The method of claim 18 in which the repositioning of the non-symmetrical conditions includes selecting the angle of the direction of flow of laminar flowing material between the different elevations of the centerlines of the first runner section and the second runner section.

22. The method of claim 18 in which the repositioning of the non-symmetrical conditions includes providing an extension of the first runner section having a cross section which is at a different height than the cross section of the second runner section, providing a flow diverter in the path of flow of the laminar flowing material between the first runner section and the second runner section, and selecting the height of the flow diverter to affect the angle of the direction of flow between the elevations of the centerline second runner section and the centerline of the first runner section including the extension.

23. The method of claim 18 wherein the repositioning includes controlling both the amount and direction of repositioning of the non-symmetrical conditions to the desired position.

24. The method of claim 18 wherein the amount of circumferential repositioning of the non-symmetrical conditions to the desired position is approximately 90 degrees.

25. The method of claim 18 which includes providing a mold body in which the second runner section extends in first direction and a second direction from the intersection by the first runner section;

a third runner section is intersected by an end of the second runner section located in the first direction and a fourth runner section is intersected by an end of the second runner section located in the second direction, with the third runner section and the fourth runner section each extending in two directions from their respective intersections with ends of the second runner section;

and the repositioning of the non-symmetrical conditions of the laminar flowing material is in a position, in a circumferential direction around the center of the path of the second runner section, which is substantially symmetrical from side-to-side relative to the third runner section and the fourth runner section such that any imbalance of flow through the third runner section and the fourth runner section is significantly improved.

26. The method according to claim 18 which includes providing a mold body in which the branching runner includes a plurality of branches which branch in two directions, and the repositioning of the non-symmetrical conditions of laminar flowing material occurs at a plurality of sequential locations along the runner.

27. The method according to claim 18 in which the repositioning of the non-symmetrical conditions of the laminar flowing material is to a position which causes the material to fill the at least one mold cavity in a selected manner.

28. A method of controlling non-symmetrical conditions of concentric laminates which occur in a direction across the flow path of a stream of laminar flowing material in a mold having a pair of mold plates, a parting line between the mold plates and a runner having at least one branch, which branches in two directions, comprising:

providing a mold body having a pair of mold plates, a parting line between the mold plates, at least one mold cavity, and a runner having at least one branch which branches in two directions, the runner including a first runner section located along the parting line and a second runner section located along the parting line;

flowing a stream of laminar flowing material in the runner to fill the at least one mold cavity, the material having non-symmetrical conditions in a direction across its path down stream of a branch in the runner;

repositioning the non-symmetrical conditions of the flowing material to a desired position in a circumferential direction around the center of the path of the runner while maintaining continuity between laminates from about the center through to the perimeter of the runner by providing the first runner section intersecting the second runner section at an angle, and the intersection occurring at an area on the periphery of the second runner section at which the centerline of the second runner section and the centerline of the intersecting first runner section are at different elevations from one another, at which area the laminar flowing material flows in a direction between the two elevations which is not in the same direction as the flow in either the first runner section or the second runner section;

allowing the laminar flowing material to solidify in the runner during each molding cycle, and thereafter during each molding cycle ejecting the solidified material from the runner along the parting line between the two mold plates.

29. The method of claim 28 which includes selecting the amount of the change in elevation which occurs between the centerline of the first runner section and centerline of the second runner section to affect the amount of repositioning of the non-symmetrical conditions which occurs.

30. The method of claim 28 which includes selecting the angle at the intersection of the first runner section and the second runner section to affect the amount of repositioning of the non-symmetrical conditions which occurs.

31. The method of claim 28 in which the repositioning of the non-symmetrical conditions includes selecting the angle of the direction of flow of laminar flowing material between the different elevations of the centerlines of the first runner section and the second runner section.

32. The method of claim 28 in which the repositioning of the non-symmetrical conditions includes causing the first runner section to terminate at an end surface having an angle with respect to the plane of the parting line, and further includes selecting the end surface termination angle to affect the amount of repositioning of the non-symmetrical conditions which occurs.

33. The method of claim 28 in which the repositioning of the non-symmetrical conditions includes providing an extension of the first runner section having a cross section which is at a different height than the cross section of the second runner section, providing a flow diverter in the path of flow of the laminar flowing material between the first runner section and the second runner section, and selecting the height of the flow diverter to affect the angle of the direction of flow between the elevations of the centerline second runner section and the centerline of the first runner section including the extension.

34. The method of claim 28 wherein the repositioning includes controlling both the amount and direction of repositioning of the non-symmetrical conditions to the desired position.

35. The method of claim 28 wherein the amount of circumferential repositioning of the non-symmetrical conditions to the desired position is approximately 90 degrees.

36. The method of claim 28 which includes providing a mold body in which the second runner section extends in first direction and a second direction from the intersection by the first runner section;

a third runner section intersected by an end of the second runner section located in the first direction and a fourth runner section intersected by an end of the second runner section located in the second direction, with the third runner section and the fourth runner section each extending in two directions from their respective intersections with ends of the second runner section;

and the repositioning of the non-symmetrical conditions of the laminar flowing material is in a position, in a circumferential direction around the center of the path of the second runner section, which is substantially symmetrical from side-to-side relative to the third runner section and the fourth runner section such that any imbalance of flow through the third runner section and the fourth runner section is significantly improved.

37. The method according to claim 28 which includes providing a mold body in which the branching runner includes a plurality of branches which branch in two directions and the repositioning of the non-symmetrical conditions of laminar flowing material occurs at a plurality of sequential locations along the runner.

38. The method according to claim 28 in which the repositioning of the non-symmetrical conditions of the laminar flowing material is to a position which causes the material to fill the at least one mold cavity in a selected manner.

39. A mold which includes a laminate repositioner for controlling within the mold non-symmetrical conditions which occur in a direction across the flow path of laminates of a stream of laminar flowing material, comprising, in combination:

a mold body, said mold body having at least one mold cavity and at least one runner which branches in two directions, said at least one runner having a centerline and a periphery, said at least one runner having at least a first runner section and a second runner section; and said first runner section intersecting said second runner section;

said mold body adapted to have a stream of laminar flowing material flowing in said at least one runner to fill said at least one mold cavity, said at least one runner having non-symmetrical conditions in a direction across its flow path downstream of the intersection of said first runner section with said second runner section; and a laminate repositioner located in at least a portion of said runner in which the non-symmetrical conditions occur across the stream of laminar flowing material, said laminate repositioner repositioning the non-symmetrical conditions of the flowing material in a circumferential direction around the center of the path of said runner to a desired circumferential position while maintaining continuity between laminates from about the center through to the perimeter of said runner.

40. The mold according to claim 39 wherein the laminate repositioner includes a structure which determines both the amount and the direction of circumferential repositioning of the non-symmetrical conditions of the flowing material to the desired position.

41. The mold according to claim 39 wherein said laminate repositioner causes circumferential repositioning of the non-symmetrical conditions of approximately 90 degrees to the desired position.

42. A mold according to claim 39 wherein said laminate repositioner comprises in said runner a length of runner having a spiraling circumference with a non-circular cross sectional shape which is progressively repositioned along said length of runner.

43. A mold according to claim 39 wherein said laminate repositioner comprises in said runner a length of runner having a spiraling circumference with a non-circular cross sectional shape which is progressively repositioned along said length of runner, with the amount of spiraling causing the non-circular cross sectional shape to be repositioned at an angle of less than 180 degrees.

44. A mold according to claim 39 wherein:
said second runner section extends in a first direction and in a second direction from the intersection of said first runner section with said second runner section;
said laminate repositioner comprises, between said first runner section and said second runner section, a first length of runner having a spiraling circumference with a non-circular cross sectional shape which is progressively repositioned along said first length of runner toward the first direction of said second runner section and a second length of runner having a spiraling circumference with a non-circular cross sectional shape which is progressively repositioned along second length of runner toward the second direction of said second runner section.

45. A mold according to claim 39 wherein:
said second runner section extends in a first direction and in a second direction from the intersection of said first runner section with said second runner section; and
the laminate repositioner comprises, between said first runner section and said second runner section, a first length of runner having a spiraling circumference with a non-circular cross sectional shape which is progressively repositioned along said first length of runner toward the first direction of said second runner section and a second length of runner having a spiraling circumference with a non-circular cross sectional shape which is progressively repositioned along second length of runner toward the second direction of said second runner section, with the amount of repositioning of the non-circular cross sectional shape of both said first length of runner and said second length of runner being an angle of less than 180 degrees.

46. A mold according to claim 39 wherein said laminate repositioner includes, in said runner, a runner dividing member having a spiraling shape which divides the cross section of said runner substantially in half along a radial direction to circumferentially reposition the non-symmetrical conditions of the laminate flowing material.

47. A mold according to claim 39 wherein said laminate repositioner includes, in said runner, a runner dividing member having a spiraling shape which divides the cross section of said runner substantially in half along a radial direction to circumferentially reposition the non-symmetrical conditions of the laminar flowing material to a position which is at an angle of less than 180 degrees from the original position of the non-symmetrical conditions.

48. A mold according to claim 39 wherein said laminate repositioner is located at the intersection of said first runner section and said second runner section of said runner, said second runner section extends in a first direction and a second direction from the intersection, and said laminate repositioner comprises a body at the intersection of said first runner section and said second runner section having a cross section which is smaller than the cross section of either of said first runner section or said second runner section and is shorter in height than the height of either said first runner section or said second runner section.

49. A mold according to claim 39 wherein said laminate repositioner is located at the intersection of said first runner section of the runner and said second runner section, said second runner section extends in a first direction and a second direction from the intersection, and said laminate repositioner comprises a body at the intersection of the first runner section and the second runner section, said body having a cross section which is smaller than the cross section of either of said first runner section or said second runner section and said body is shorter in height than the height of either said first runner section or said second runner section, with the cross sectional size, the height and the position of the body selected to determine the amount of repositioning of the non-symmetrical conditions which occurs.

50. A mold according to claim 39 wherein said second runner section extends in a first direction and in a second direction from the intersection by said first runner section; a third runner section intersected by an end of said second runner section located in the first direction and a fourth runner section intersected by an end of said second runner section located in the second direction, with said third runner section and said fourth runner section each extending in two directions from their respective intersections with ends of the second runner; and said laminate repositioner causes the repositioning of the non-symmetrical conditions of the flowing material to a position, in a circumferential direction around the center of the path of said second runner section, which is substantially symmetrical from side-to-side relative to said third runner section and said fourth runner section such that any imbalance of flow through said third runner section and said fourth runner section is significantly improved.

51. A mold according to claim 39 in which said at least one runner which branches at least once in two directions includes a plurality of branches in two directions and further includes a plurality of laminate repositioners of the non-symmetrical conditions of the laminar flowing material located at a plurality of sequential locations along the runner.

52. A mold according to claim 39 in which said laminate repositioner repositions the non-symmetrical conditions of the laminar flowing material to a position which causes the material to fill said at least one mold cavity in a selected manner.

53. A mold according to claim 39 in which said laminate repositioner repositions the non-symmetrical conditions of the laminar flowing material substantially at the intersection of said second runner section by said first runner section.

54. A mold according to claim 39 in which said laminate repositioner includes said first runner section intersecting the second runner section at an angle of about 90 degrees and further causes the repositioning the non-symmetrical conditions of the laminar flowing material substantially at the intersection of the second runner section by the first runner section.

55. A mold according to claim 39 in which said second runner section extends at a first angle in a first direction from the intersection by said first runner section and at a second angle in a second direction from said intersection by said first runner section, which angles have a value other than 90 degrees, and said laminate repositioner repositions the non-symmetrical conditions of the laminar flowing material substantially at the intersection of said second runner section by said first runner section.

56. A mold according to claim 39 in which said laminate repositioner includes said first section intersecting said second runner section at an angle and the intersection occurring at an area on the periphery of said second runner section at which the centerline of said second runner section and the centerline of said intersecting first runner section are at different elevations with respect to one another, at which area on the periphery of said second runner section the laminar flowing material flows in a direction between the two elevations which is not the same direction as the flow in either said first runner section or said second runner section.

57. A mold according to claim 39 in which said laminate includes said first runner section intersecting said second runner section at an angle, with the intersection located at an area on the periphery of said second runner section at which the centerline of said second runner section and the centerline of said intersecting first runner section of said runner are at different elevations from one another, at which area the laminar flowing material flows in a direction between the two elevations which is not in the same direction as the flow in either said first runner section or said second runner section.

58. A mold according to claim 57 in which the amount of the difference in elevation between the centerline of said first runner section and the centerline of said second runner section affects the amount of repositioning of the non-symmetrical conditions which occurs.

59. A mold according to claim 57 in which the angle at the intersection of the first runner section and the second runner section affects the amount of repositioning of the non-symmetrical conditions which occurs.

60. A mold according to claim 57 in which the angle of the direction of flow of laminar flowing material between the elevation difference between the centerlines of said first runner section and said second runner section is selected to affect the amount of repositioning of the non-symmetrical conditions which occurs.

61. A mold according to claim 57 in which said runner includes an extension of said first runner section having a cross section which is at a different height than the cross section of said second runner section and further includes a flow diverter in the path of flow of the laminar flowing material between said first runner section and said second runner section, and the height of said flow diverter is chosen to affect the angle of the direction of flow between the elevations of the centerline of said second runner section and the centerline of said first runner section including said extension.

62. The mold according to claim 57 wherein the laminate repositioner includes a structure which determines both the amount and the direction of circumferential repositioning of the non-symmetrical conditions of the flowing material to the desired position.

63. The mold according to claim 57 wherein said laminate repositioner causes circumferential repositioning of the non-symmetrical conditions of approximately 90 degrees to the desired position.

64. A mold according to claim 57 wherein said second runner section extends in a first direction and in a second direction from the intersection by said first runner section; a third runner section intersected by an end of said second runner section located in the first direction and a fourth runner section intersected by an end of said second runner section located in the second direction, with said third runner section and said fourth runner section each extending in two directions from their respective intersections with ends of the second runner; and said laminate repositioner causes the repositioning of the non-symmetrical conditions of the flowing material to a position, in a circumferential direction around the center of the path of said second runner section, which is substantially symmetrical from side-to-side relative to said third runner section and said fourth runner section such that any imbalance of flow through said third runner section and said fourth runner section is significantly improved.

65. A mold according to claim 57 in which said at least one runner which branches at least once in two directions includes a plurality of branches in two directions and further includes a plurality of laminate repositioners of the non-symmetrical conditions of the laminar flowing material located at a plurality of sequential locations along the runner.

66. A mold according to claim 57 in which said laminate repositioner repositions the non-symmetrical conditions of the laminar flowing material to a position which causes the material to fill said at least one mold cavity in a selected manner.

67. A mold which includes a laminate repositioner for controlling within the mold non-symmetrical conditions which occur in a direction across the flow path of laminates of a stream of laminar flowing material, comprising, in combination:

a mold body having a pair of mold plates and a parting line between said mold plates, said mold body having at least one mold cavity and at least one runner which branches in two directions, said at least one runner having a centerline and a periphery, said at least one runner having at least a first runner section and a second runner section located along the parting line; and said first runner section intersecting said second runner section;

said mold body adapted to have a stream of laminar flowing material flowing in said at least one runner to fill said at least one mold cavity, and adapted to have the laminar flowing material solidify during each molding cycle and to eject the solidified runner from the mold body during each molding cycle, the laminar flowing material in said at least one runner having non-symmetrical conditions in a direction across its flow path downstream of the intersection of said first runner section with said second runner section; and a laminate repositioner located in at least a portion of said runner in which the non-symmetrical conditions occur across the stream of laminar flowing material, said laminate repositioner repositioning the non-symmetrical conditions of the flowing material in a circumferential direction around the center of the path of said runner to a desired circumferential position while maintaining continuity between laminates from about the center through to the perimeter of said runner; said laminate repositioner including said first runner section intersecting said second runner section at an angle with the intersection located at an area on the periphery of said second runner section at which the centerline of said second runner section and the centerline of said intersecting first runner section of said runner are at different elevations from one another, at which area the laminar flowing material flows in a direction between the two elevations which is not in the same direction as the flow in either said first runner section or said second runner section.

68. A mold according to claim 67 in which the amount of the difference in elevation between the centerline of said first runner section and the centerline of said second runner section affects the amount of repositioning of the non-symmetrical conditions which occurs.

69. A mold according to claim 67 in which the angle at the intersection of the first runner section and the second runner section affects the amount of repositioning of the non-symmetrical conditions which occurs.

70. A mold according to claim 67 in which the angle of the direction of flow of laminar flowing material between the elevation difference between the centerlines of said first runner section and said second runner section is selected to affect the amount of repositioning of the non-symmetrical conditions which occurs.

71. The method of claim 67 in which said first runner section terminates at an end surface having an angle with respect to the plane of the parting line, and the end surface termination angle is chosen to affect the amount of repositioning of the non-symmetrical conditions which occurs.

72. A mold according to claim 67 in which said runner includes an extension of said first runner section having a cross section which is at a different height than the cross section of said second runner section and further includes a flow diverter in the path of flow of the laminar flowing material between said first runner section and said second runner section, and the height of said flow diverter is chosen to affect the angle of the direction of flow between the elevations of the centerline of said second runner section and the centerline of said first runner section including said extension.

73. The mold according to claim 67 wherein the laminate repositioner includes a structure which determines both the amount and the direction of circumferential repositioning of the non-symmetrical conditions of the flowing material to the desired position.

74. The mold according to claim 67 wherein said laminate repositioner causes circumferential repositioning of the non-symmetrical conditions of approximately 90 degrees to the desired position.

75. A mold according to claim 67 wherein said second runner section extends in a first direction and in a second direction from the intersection by said first runner section; a third runner section intersected by an end of said second runner section located in the first direction and a fourth runner section intersected by an end of said second runner section located in the second direction, with said third runner section and said fourth runner section each extending in two directions from their respective intersections with ends of the second runner; and said laminate repositioner causes the repositioning of the non-symmetrical conditions of the flowing material to a position, in a circumferential direction around the center of the path of said second runner section, which is substantially symmetrical from side-to-side relative to said third runner section and said fourth runner section such that any imbalance of flow through said third runner section and said fourth runner section is significantly improved.

76. A mold according to claim 67 in which said at least one runner which branches at least once in two directions includes a plurality of branches in two directions and further includes a plurality of laminate repositioners of the non-symmetrical conditions of the laminar flowing material located at a plurality of sequential locations along the runner.

77. A mold according to claim 67 in which said laminate repositioner repositions the non-symmetrical conditions of the laminar flowing material to a position which causes the material to fill said at least one mold cavity in a selected manner.

* * * * *